(12) United States Patent
Park

(10) Patent No.: US 9,575,708 B2
(45) Date of Patent: *Feb. 21, 2017

(54) PORTABLE DEVICE AND METHOD FOR CONTROLLING THE SAME

(71) Applicant: LG ELECTRONICS INC., Seoul (KR)

(72) Inventor: Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

This patent is subject to a terminal disclaimer.

(21) Appl. No.: 14/577,683

(22) Filed: Dec. 19, 2014

(65) Prior Publication Data

US 2015/0130738 A1 May 14, 2015

Related U.S. Application Data

(63) Continuation-in-part of application No. 14/408,480, filed as application No. PCT/KR2012/005136 on Jun. 28, 2012.

(30) Foreign Application Priority Data

May 14, 2012 (KR) .................. 10-2012-0051093

(51) Int. Cl.
*G06F 3/14* (2006.01)
*G06F 1/16* (2006.01)
(Continued)

(52) U.S. Cl.
CPC .......... *G06F 3/1423* (2013.01); *G06F 1/1647* (2013.01); *G06F 1/1694* (2013.01); *G06F 1/3265* (2013.01);
(Continued)

(58) Field of Classification Search
CPC ...... G06F 3/1423; G06F 1/1694; G06F 3/017; G06F 1/3265; G06F 1/3287; G06F 3/1446; G06F 1/1647; G06F 2200/1637; G09G 2320/028; G09G 2300/023; G09G 2354/00; G09G 2360/04
(Continued)

(56) References Cited

U.S. PATENT DOCUMENTS 6,577,496 B1 * 6/2003 Gioscia ................ G06F 1/1616
345/156
7,460,108 B2 12/2008 Tamura
(Continued)

FOREIGN PATENT DOCUMENTS

EP  1 843 563 A1  10/2007
EP  2 341 418 A1  7/2011
(Continued)

OTHER PUBLICATIONS

Shen et al., "Double-side Multi-touch Input for Mobile Devices," CHI 2009—Digital Life, New World: Conference Proceedings and Extended Abstracts; The 27th Annual Chi Conference on Human Factors in Computing Systems, USA, Apr. 4-9, 2009, XP007912043, pp. 4339-4344.

*Primary Examiner* — Michael Pervan
(74) *Attorney, Agent, or Firm* — Birch, Stewart, Kolasch & Birch, LLP

(57) ABSTRACT

A method for controlling a portable device including first and second display units at opposing surfaces of the portable device. The method includes detecting one of a first unlock command for switching a state of the first display unit to an active state and maintaining a state of the second display unit in a locked state or a second unlock command for switching the state of the first display unit to the active state and switching the state of the second display unit to a ready-to-activate state; switching the state of the first display unit to (Continued)

the active state and switching the state of the second display unit to the ready-to-activate state when the second unlock command is detected; detecting an unlock trigger for switching the second display unit, which is in the ready-to-activate state, to the active state; and switching the second display unit, which is in the ready-to-activate state, to the active state according to the detected unlock trigger.

20 Claims, 28 Drawing Sheets

(51) Int. Cl.
    *G06F 1/32*     (2006.01)
    *G06F 3/01*     (2006.01)
(52) U.S. Cl.
    CPC ............ *G06F 1/3287* (2013.01); *G06F 3/017* (2013.01); *G06F 3/1446* (2013.01); *G06F 2200/1637* (2013.01); *G09G 2300/023* (2013.01); *G09G 2320/028* (2013.01); *G09G 2354/00* (2013.01); *G09G 2360/04* (2013.01); *Y02B 60/1242* (2013.01); *Y02B 60/1282* (2013.01)
(58) Field of Classification Search
    USPC ........ 178/18.01–19.07; 345/1.1–7, 156–178; 455/566
    See application file for complete search history.

(56) References Cited

U.S. PATENT DOCUMENTS

| | | | |
|---|---|---|---|
| 7,466,961 B1 * | 12/2008 | Gioscia | H04M 1/0214 455/566 |
| 7,657,849 B2 | 2/2010 | Chaudhri et al. | |
| 8,204,558 B2 * | 6/2012 | Gioscia | H04M 1/0214 455/566 |
| 8,416,148 B1 | 4/2013 | Park | |
| 8,593,371 B1 | 11/2013 | Park | |
| 8,674,900 B2 | 3/2014 | Park | |
| 8,872,730 B2 | 10/2014 | Park | |
| 2006/0277488 A1 | 12/2006 | Cok et al. | |
| 2008/0129699 A1 | 6/2008 | Cho et al. | |
| 2010/0099394 A1 | 4/2010 | Hainzl | |
| 2010/0306693 A1 | 12/2010 | Brinda | |
| 2011/0001687 A1 | 1/2011 | Srinivasan et al. | |
| 2011/0045812 A1 | 2/2011 | Kim et al. | |
| 2011/0175805 A1 | 7/2011 | Rottler et al. | |
| 2011/0247065 A1 | 10/2011 | Melnyk | |
| 2013/0147712 A1 | 6/2013 | Zhou et al. | |
| 2015/0130738 A1 | 5/2015 | Park | |

FOREIGN PATENT DOCUMENTS

| | | |
|---|---|---|
| KR | 20-0442784 Y1 | 12/2008 |
| KR | 10-2010-0007127 A | 1/2010 |
| WO | WO 2012/025029 A1 | 7/2011 |
| WO | WO 2011/096675 A2 | 8/2011 |

* cited by examiner

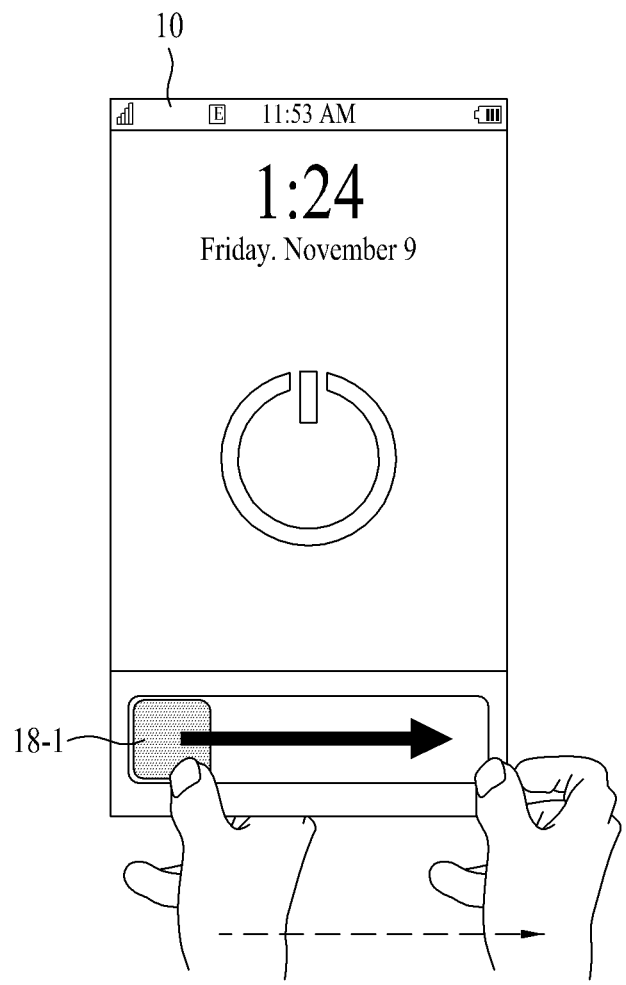

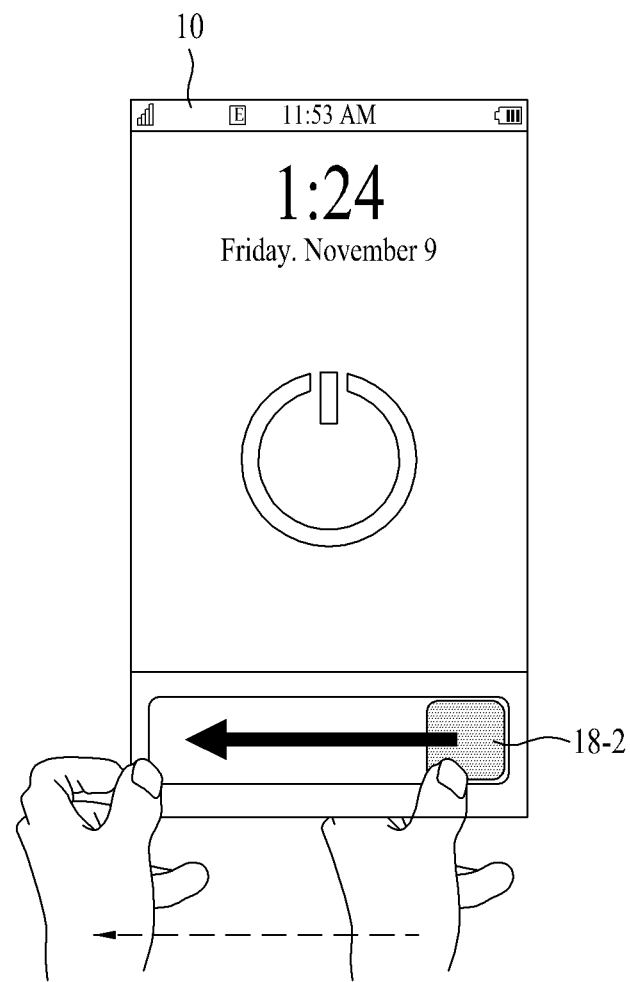

FIG. 14
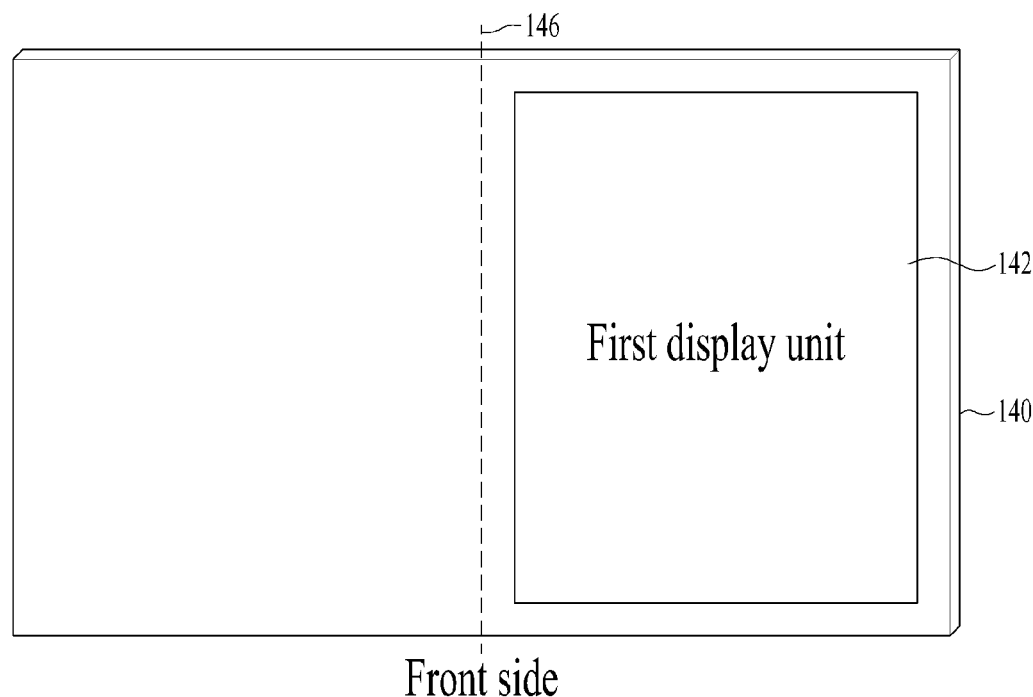
Front side
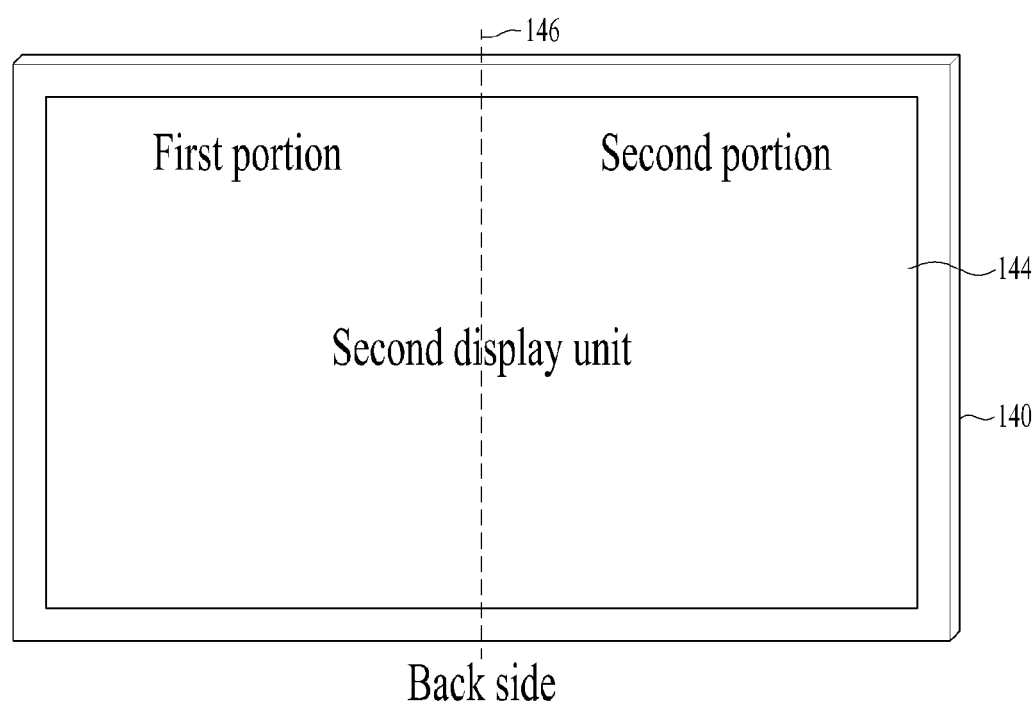
Back side

FIG. 15
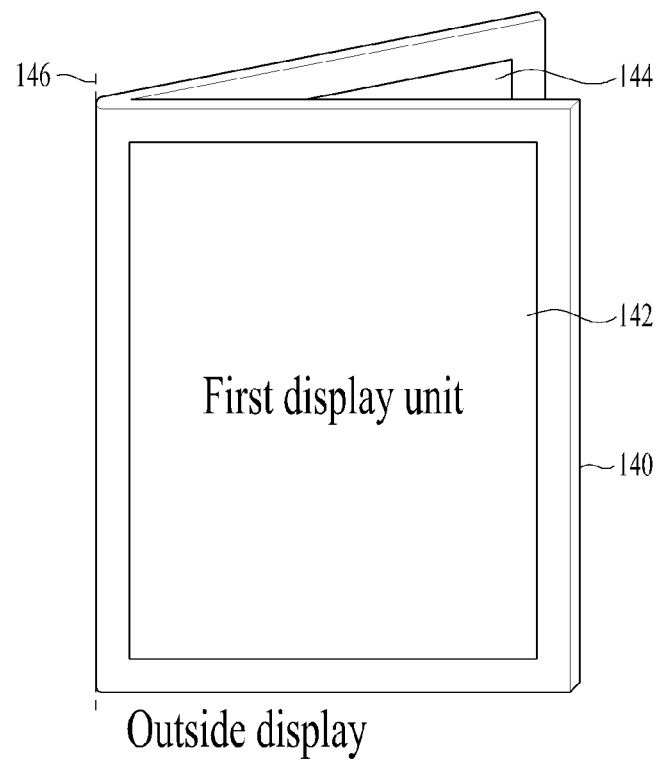
Outside display
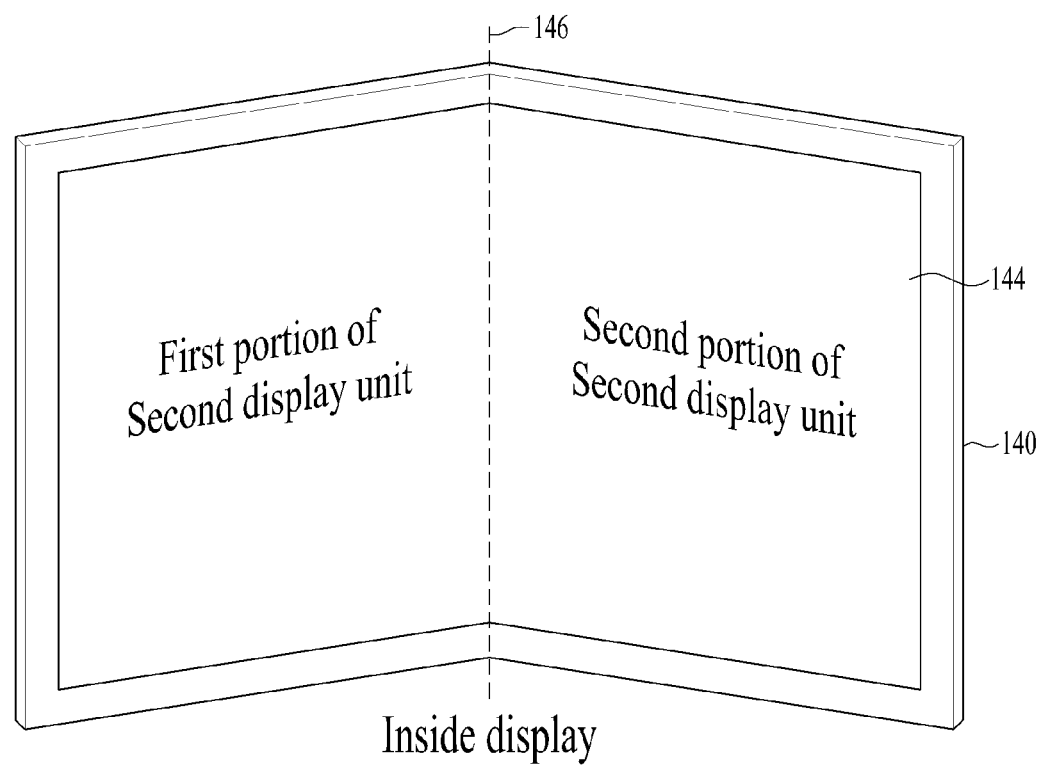
Inside display

FIG. 16
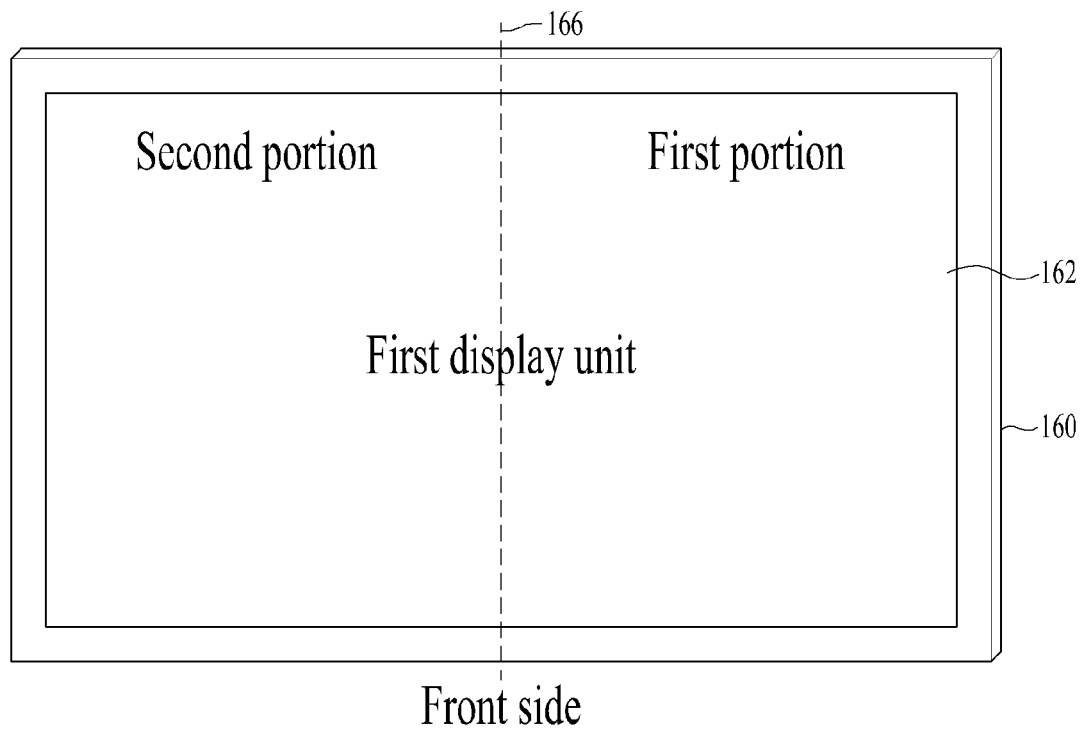
Front side
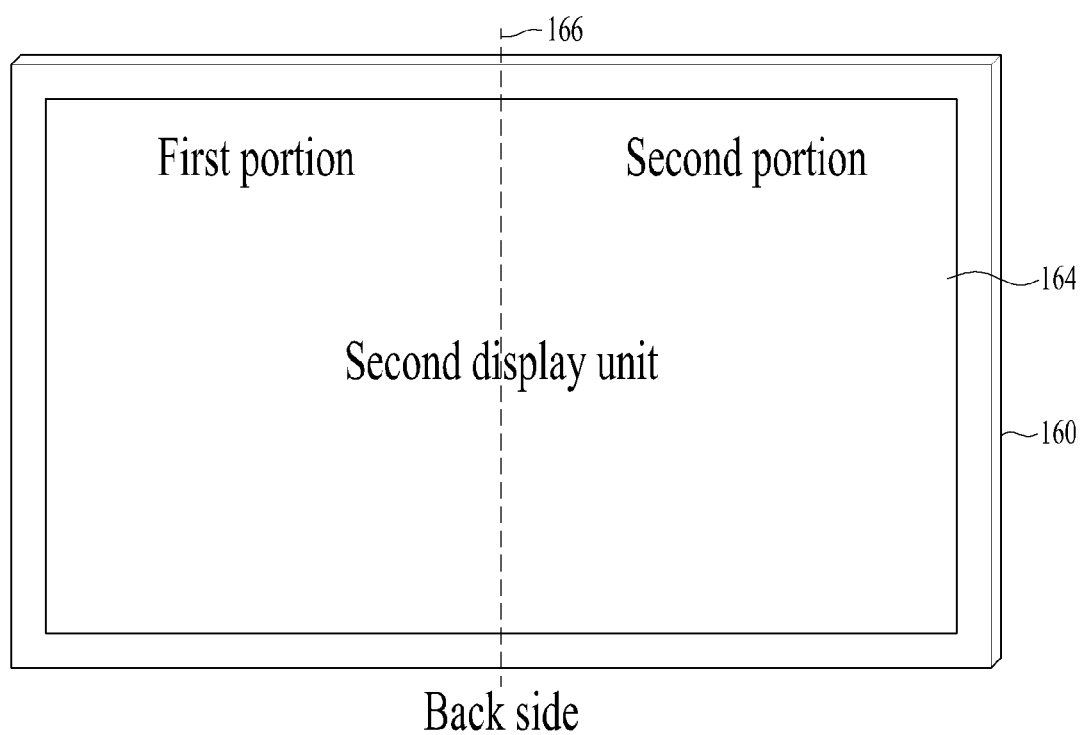
Back side

FIG. 18
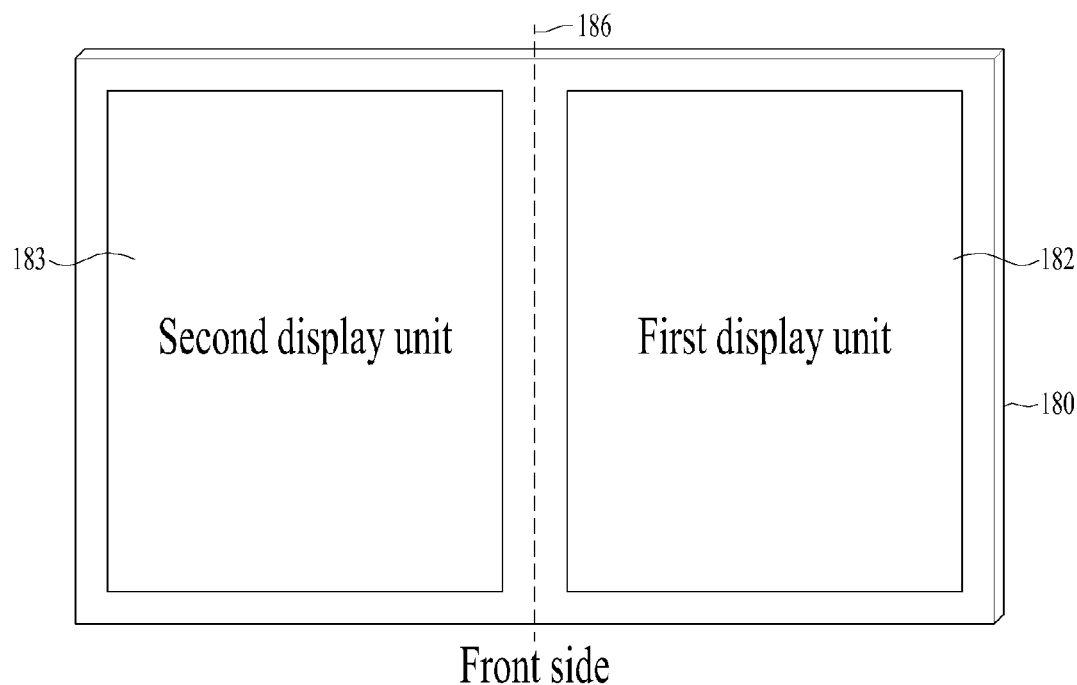
Front side
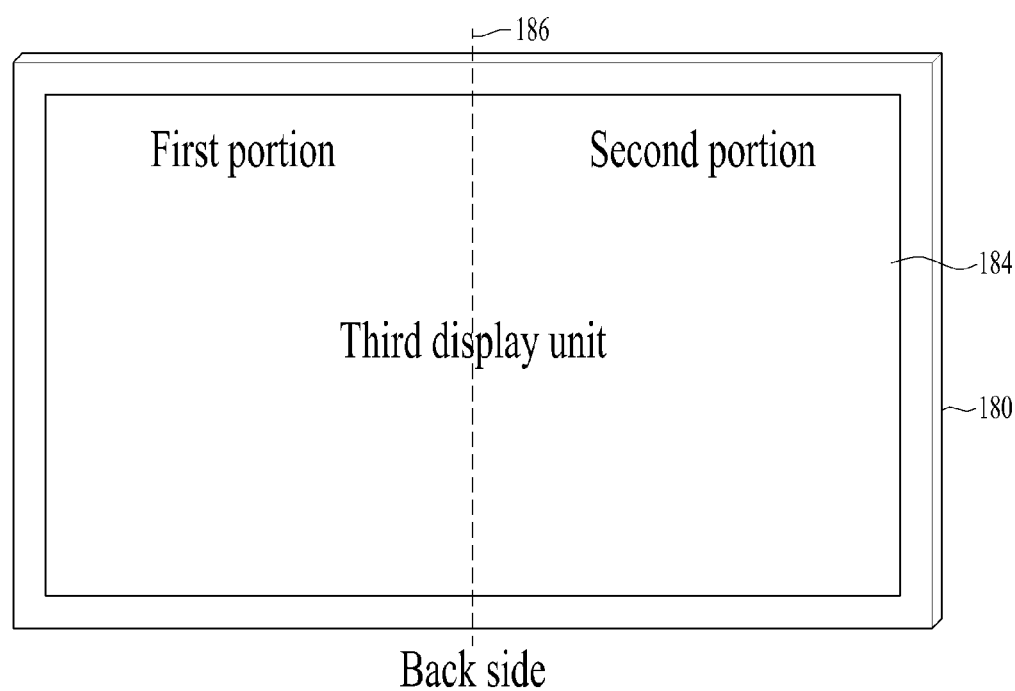
Back side

FIG. 19
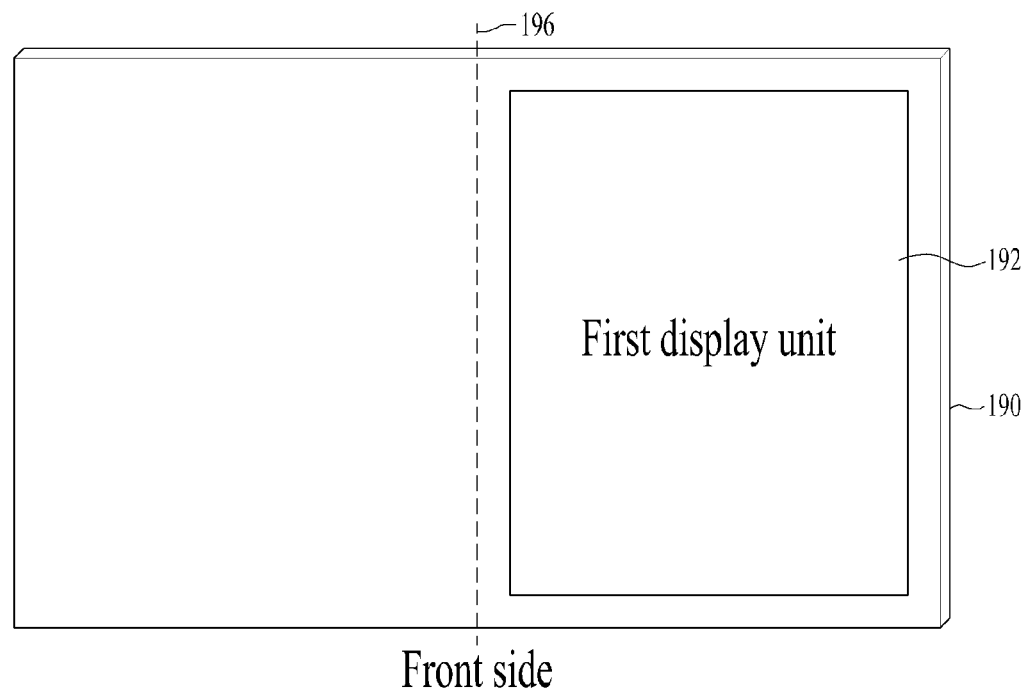
Front side
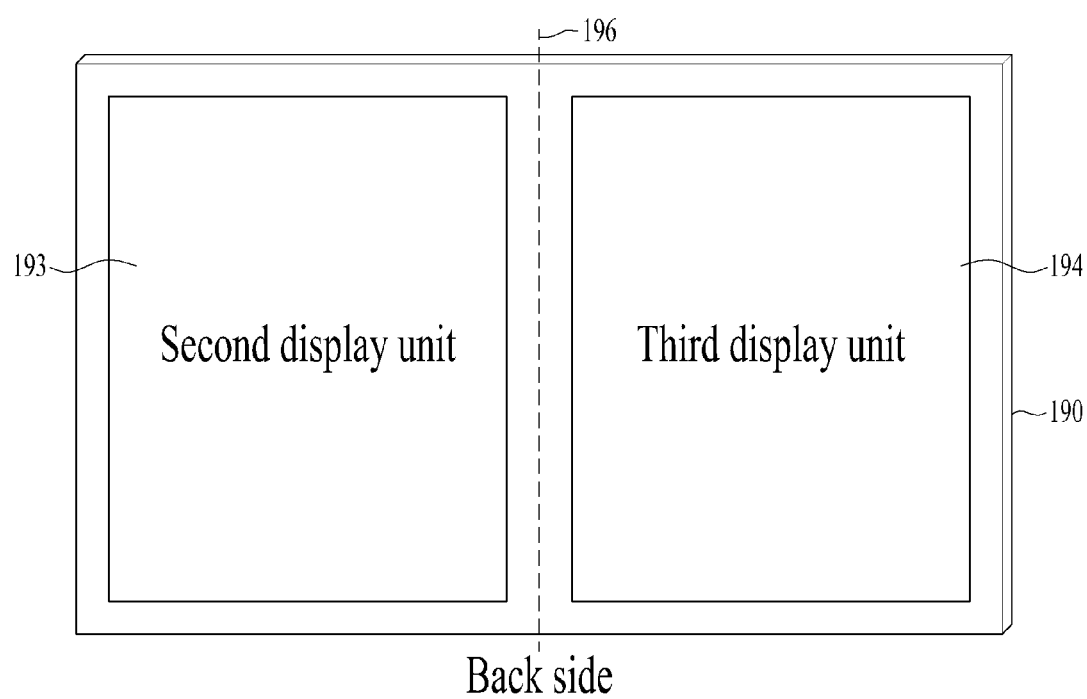
Back side

FIG. 20
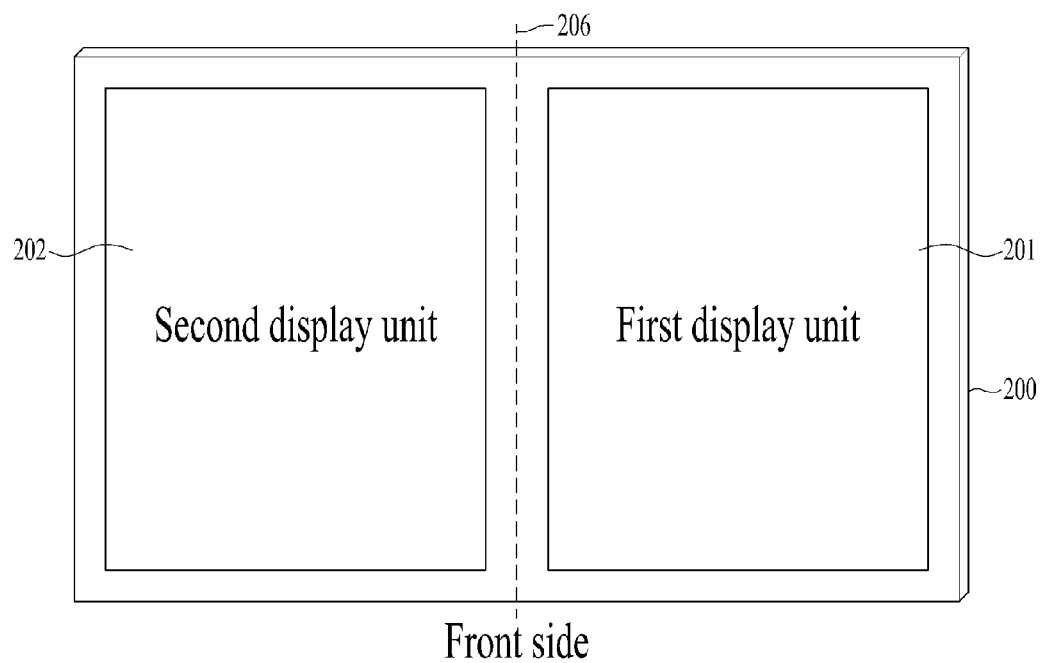
Front side
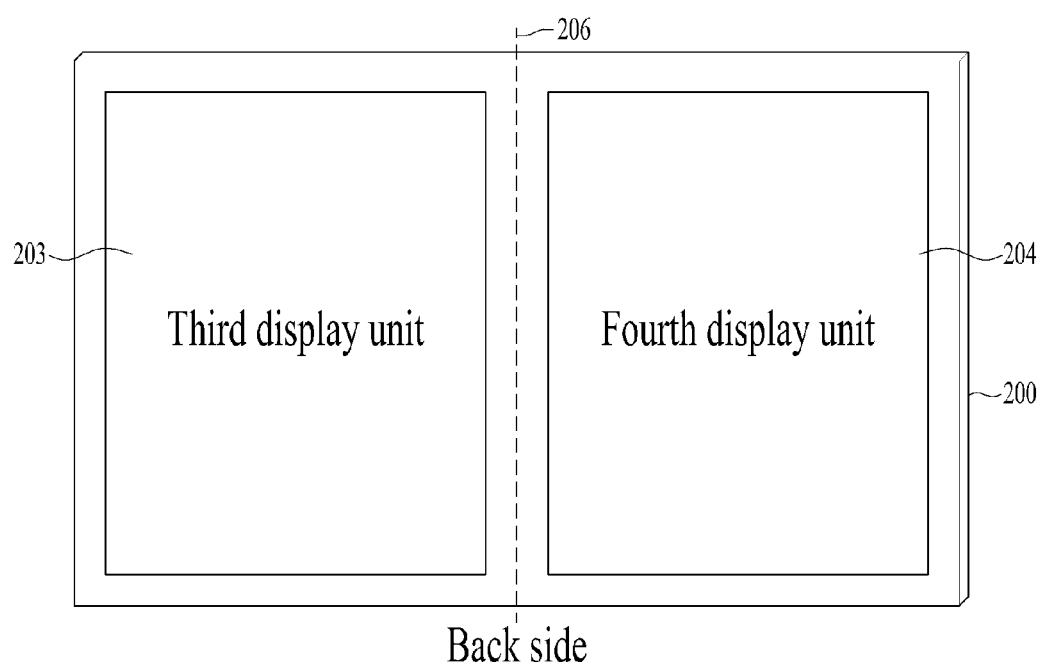
Back side

FIG. 22
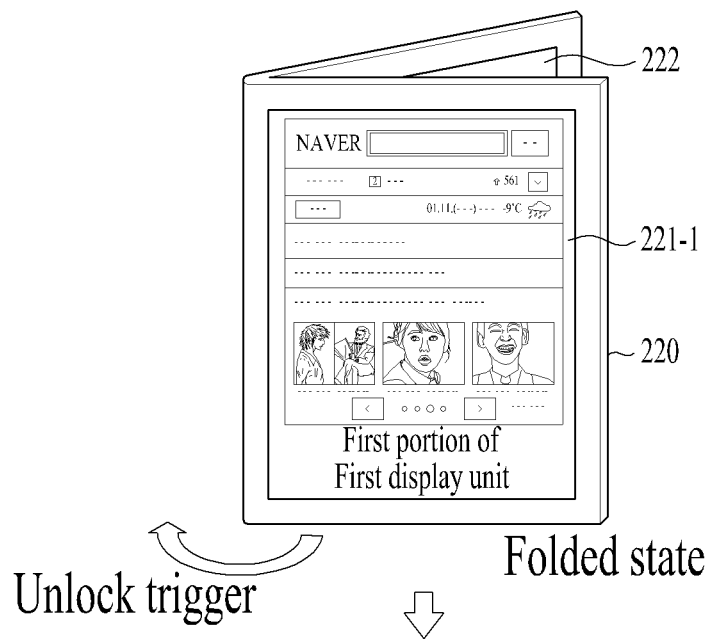
Unlock trigger    Folded state
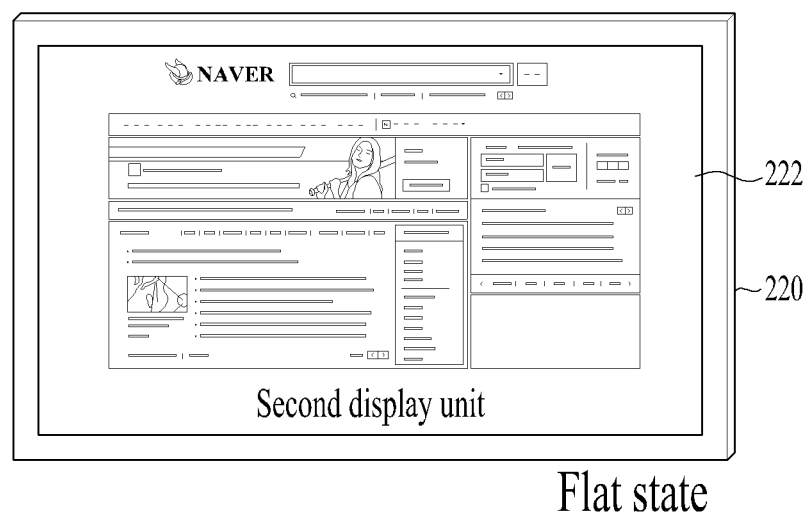
Flat state

FIG. 23
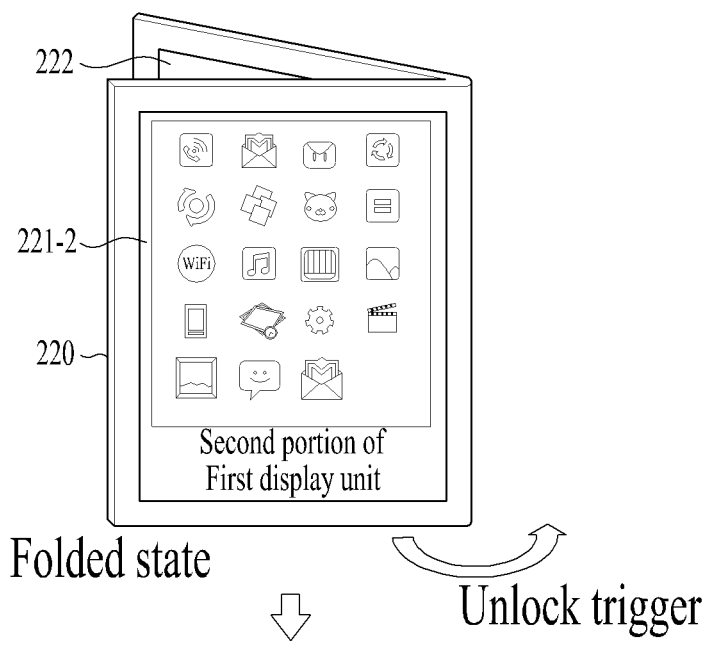
Folded state
Unlock trigger
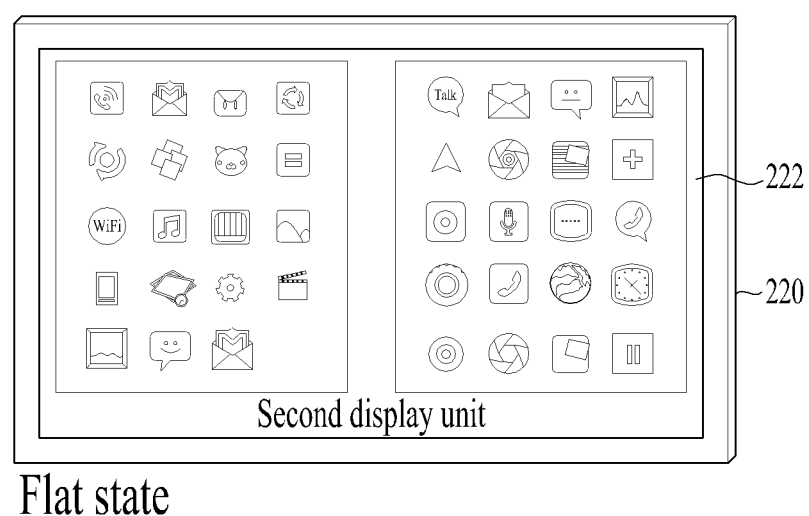
Flat state

PORTABLE DEVICE AND METHOD FOR CONTROLLING THE SAME

CROSS REFERENCE TO RELATED APPLICATIONS

This application is a Continuation-in-Part of copending U.S. patent application Ser. No. 14/408,480, filed on Dec. 16, 2014. U.S. patent application Ser. No. 14/408,480 is a National Phase of PCT International Application No. PCT/KR2012/005136 filed on Jun. 28, 2012, which claims priority under 35 U.S.C. 119(a) to Patent Application No. 10-2012-0051093, filed in the Republic of Korea on May 14, 2012, all of which are hereby expressly incorporated by reference into the present application.

TECHNICAL FIELD

The present invention relates to a portable device, and more particularly, to a portable device including double-sided displays and a method for controlling the same.

BACKGROUND ART

As the use of portable devices has increased, users can now use various services such as web surfing and electronic financial transactions as well as communication between individuals and music listening using portable devices. Services, which have been provided through computers, are now also provided through portable devices to allow users to use such services regardless of time and place.

However, since the portable device provides a limited-size display in order to increase portability, there is inconvenience in using various services. Thus, a double-sided-display portable device includes a display unit at the front side and a display unit at the rear side to increase user convenience compared to the conventional portable device. Since the double-sided-display portable device includes two display units, there is a need to provide a method for unlocking a plurality of display units.

DISCLOSURE OF THE INVENTION

Technical Task

Accordingly, the present invention is directed to a portable device and a method for controlling the same that substantially obviate one or more problems due to limitations and disadvantages of the related art.

Technical Solution

The object of the present invention can be achieved by providing a method for controlling a portable device including first and second display units at opposing surfaces of the portable device may include detecting, via a controller of the portable device, one of a first unlock command for switching a state of the first display unit to an active state and maintaining a state of the second display unit in a locked state or a second unlock command for switching the state of the first display unit to the active state and switching the state of the second display unit to a ready-to-activate state, switching, via the controller, the state of the first display unit to the active state and switching the state of the second display unit to the ready-to-activate state when the second unlock command is detected, detecting, via the controller, an unlock trigger for switching the second display unit, which is in the ready-to-activate state, to the active state, and switching, via the controller, the second display unit, which is in the ready-to-activate state, to the active state according to the detected unlock trigger.

In the method for controlling the portable device according to an embodiment of the present invention, the unlock trigger for the second display unit is generated as the portable device is rotated such that the second display unit faces a user or is generated upon execution of an application that operates in conjunction with the second display unit.

In the method for controlling the portable device according to an embodiment of the present invention, when the portable device is rotated, the switching of the second display unit to the active state includes activating a light emitting element of the second display unit when the portable device has been rotated by a first threshold angle and activating a touch sensor of the second display unit when the portable device has been rotated by a second threshold angle that is equal to or greater than the first threshold angle.

The method for controlling the portable device according to an embodiment may further include deactivating at least one of a light emitting element and a touch sensor of the first display unit when the portable device rotates.

In the method for controlling the portable device according to an embodiment of the present invention, when the application that operates in conjunction with the second display unit is executed, the switching of the second display unit to the active state includes activating at least one of a light emitting element and a touch sensor of the second display unit according to control of the application.

In the method for controlling the portable device according to an embodiment the first display unit faces a user and the second display unit faces the opposite direction of the first display unit.

In the method for controlling the portable device according to an embodiment of the present invention, the unlock trigger may be detected through at least one of a touch sensor, a gravity sensor, a motion sensor, a gyro sensor, an acceleration sensor, an inclination sensor, and a brightness sensor.

In the method for controlling the portable device according to an embodiment of the present invention, the second unlock command is detected simultaneously by a touch sensor of the first display unit and a touch sensor of the second display unit.

In the method for controlling the portable device according to an embodiment of the present invention, the first unlock command and the second unlock command are determined based on touch region detected by a touch sensor of the first display unit.

The method for controlling the portable device according to an embodiment may further include displaying content on the first display unit and displaying detailed content on the second display unit associated with the content displayed on the first display unit, when the unlock trigger for the second display unit is detected.

In another aspect of the present invention, a portable device may include a first and a second display units at opposing surfaces of the portable device configured to display content and a controller configured to detect one of a first unlock command for switching a state of the first display unit to an active state and maintaining a state of the second display unit in a locked state or a second unlock command for switching the state of the first display unit to the active state and switching the state of the second display unit to a ready-to-activate state, switch the state of the first display unit to the active state and switch the state of the second display unit to the ready-to-activate state when the second unlock command is detected, detect an unlock trigger for switching the second display unit, which is in the ready-to-activate state, to the active state, and switch the second display unit, which is in the ready-to-activate state, to the active state according to the detected unlock trigger.

In the portable device according to an embodiment of the present invention, wherein the unlock trigger for the second display unit is generated as the portable device is rotated such that the second display unit faces a user or is generated upon execution of an application that operates in conjunction with the second display unit.

In the portable device according to an embodiment of the present invention, wherein, when the portable device is rotated, the switching of the second display unit to the active state includes the controller activating a light emitting element of the second display unit when the portable device has been rotated by a first threshold angle and activating a touch sensor of the second display unit when the portable device has been rotated by a second threshold angle that is equal to or greater than the first threshold angle.

In the portable device according to an embodiment of the present invention, wherein the first display unit includes at least one of a light emitting element and a touch sensor, and the controller is further configured to deactivate said at least one of the light emitting element and the touch sensor of the first display unit when the portable device rotates.

In the portable device according to an embodiment of the present invention, wherein, when the application that operates in conjunction with the second display unit is executed, the switching of the second display unit to the active state includes the controller activating at least one of a light emitting element and a touch sensor of the second display unit according to control of the application.

In the portable device according to an embodiment of the present invention, wherein the first display unit faces a user and the second display unit faces the opposite direction of the first display unit.

In the portable device according to an embodiment of the present invention, wherein the unlock trigger is detected through at least one of a touch sensor, a gravity sensor, a motion sensor, a gyro sensor, an acceleration sensor, an inclination sensor, and a brightness sensor.

In the portable device according to an embodiment of the present invention, wherein the controller is further configured to detect the second unlock command by a simultaneously touching of a touch sensor of the first display unit and a touch sensor of the second display unit.

In the portable device according to an embodiment of the present invention, the first unlock command and the second unlock command are determined based on touch region detected by a touch sensor of the first display unit.

In the portable device according to an embodiment of the present invention, wherein when the controller detects the unlock trigger for the second display unit, the controller is further configured to display detailed content on the second display unit associated with the content displayed on the first display unit.

Advantageous Effects

According to the present invention, the portable device can prevent unnecessary power consumption or erroneous operation caused by unintended touch input.

According to the present invention, even when the user has not performed an individual unlock operation for each of the plurality of display units, the portable device can unlock each display unit or to simultaneously unlock the plurality of display units corresponding to user's intention.

According to the present invention, the portable device can prevent erroneous operation caused by unintended touch when the user rotates the portable device in order to use the rear display unit of the portable device.

According to the present invention, the portable device can prevent unnecessary power consumption by switching at least one of the display units to a ready-to-activate state.

According to the present invention, the portable device can display content and detailed content simultaneously on first and second display units at opposing surfaces of the portable device, and therefore the portable device can provide the user with the detailed content associated with the content displayed on the first display unit while allowing the user to continuously use the content displayed on the first display unit.

According to the present invention, the portable device can display the same content on display units at opposing surfaces of the portable device and therefore it is possible to share the content with another user who is located opposite the user.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIGS. 3a and 3b illustrate an unlock command of a portable device according to another embodiment of the present invention;

FIG. 14 illustrates a double-sided foldable device in a flat state according to an embodiment of the present invention.

FIG. 15 illustrates the double-sided foldable device in a folded state according to an embodiment of the present invention.

FIG. 16 illustrates a double-sided foldable device in a flat state according to another embodiment of the present invention.

FIG. 18 illustrates a double-sided foldable device in a flat state according to another embodiment of the present invention.

FIG. 19 illustrates a double-sided foldable device in a flat state according to another embodiment of the present invention.

FIG. 20 illustrates a double-sided foldable device in a flat state according to another embodiment of the present invention.

FIGS. 22 and 23 illustrate correlation of visual information displayed in a folded state and an unfolded state of a double-sided foldable device according to an embodiment of the present invention.

BEST MODE

Figure 1A:
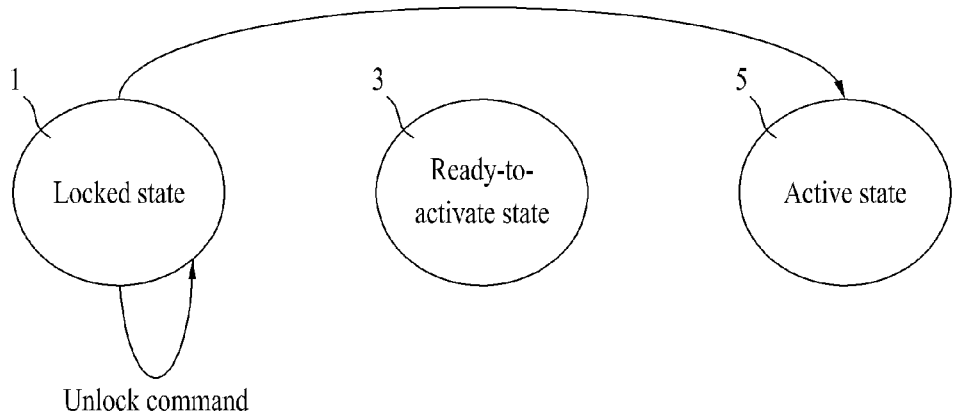
FIGS. 1a, 1b, and 1c illustrate state switching of the portable device according to an embodiment of the present invention.

Although embodiments of the present invention will be described in detail with reference to the accompanying drawings and information written on the drawings, the present invention is not limited or restricted by the embodiments.

Although most terms of elements in the present invention have been selected from general ones widely used in the art taking into consideration functions thereof in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the overall content of this specification together with the intended meanings of the terms rather than their simple names or meanings.

A display unit included in the portable device displays content, an application, or the like to the user. The portable device of the present invention may include display units respectively on the front and rear surfaces of the portable device. A display unit located at the user side may be referred to as a first display unit and a display unit located at the opposite side may be referred to as a second display unit, regardless of whether the display unit is provided on the front or rear surface of the portable device. In other words, the portable device including the first display unit and the second display unit at opposing surfaces of the portable device, the first display unit faces a user and the second display unit faces the opposite direction of the first display unit. The portable device of the present invention may include a flexible display unit and may also include a flexible display unit that is folded to be provided on both surfaces of the portable device. In this case, a portion of the folded flexible display that is provided at the user side may be referred to as a first display unit and a portion thereof provided at the opposite side may be referred to as a second display unit.

The portable device of the present invention may switch states of each display unit through an unlock command or an unlock trigger and the state of the display unit may be switched from one of the three states, a locked state, a ready-to-activate state, and an active state, to another state.

The term "locked state" refers to a state in which the display unit is inactive and at least one of a light emitting element and a touch sensor of the display unit is inactive. When the display unit is in a locked state, the portable device cannot provide an application or content to the user through the display unit. However, the portable device may partially activate the touch sensor or the light emitting element of the display unit in order to detect an unlock command input by the user or to inform the user of how to input an unlock command.

The term "ready-to-activate state" refers to a standby state before the display unit switches to an active state. When the portable device has detected an unlock command, the portable device may not switch the display unit directly to an active state but may instead switch the display unit to a ready-to-activate state and then switch the display unit from the ready-to-activate state to an active state when the portable device has additionally detected an unlock trigger. That is, when the display unit is in the ready-to-activate state, the portable device may switch the display unit to an active state through an unlock trigger alone even when an unlock command has not been given, unlike when the display unit is in the locked state.

When the display unit is in the ready-to-activate state, at least one of the light emitting element and the touch sensor of the display unit is inactive. In the ready-to-activate state, the portable device is in a state before providing an application or content to the user through the display unit, similar to the locked state. However, the portable device may partially activate the touch sensor or the light emitting element of the display unit in order to detect an unlock trigger input by the user or to inform the user of how to input an unlock trigger.

The term "active state" refers to a state in which the display unit is active. When the display unit is switched to the active state, the portable device may activate at least one of the light emitting element and the touch sensor of the display unit. The term "light emitting element" may refer to a device for emitting light which can change luminance of the display unit. For example, the light emitting element may include a self-emissive diode included in a display unit such as a Light Emitting Diode (LED) or an Organic Light Emitting Diode (OLED). In addition, when the light emitting element is not a self-emissive display, the light emitting element may include a backlight provided in the display unit.

The portable device may sense user touch, display content, or execute an application using at least one of the light emitting element and the touch sensor which has been activated.

FIG. 1 illustrates state switching of the portable device according to an embodiment of the present invention. In FIG. 1, circular nodes represent a locked state 1, a ready-to-activate state 3, and an active state 5 of the display unit. Each arrow above the nodes indicates state switching of the first display unit and each arrow below the nodes indicates state switching of the second display unit which is located at the opposite side to the first display unit.

In the portable device of the present invention, the second display unit may be located at the opposite side of the portable device to the user such that the second display unit may not be exposed to the eyes of the user. Thus, the second display unit may be unnecessarily activated, causing unnecessary power consumption. In addition, when the portable device is gripped by the user, activation of a touch sensor of the second display unit may cause erroneous operation by unintended touch. Accordingly, when an unlock command is detected, the portable device of the present invention may switch the state of the second display unit to the ready-to-activate state rather than immediately switching the same to the active state. Thereafter, when an unlock trigger for the second display unit is detected, the portable device may switch the state of the second display unit to the active state.

The portable device of the present invention can discriminate and detect a plurality of unlock commands and may perform state switching of the display unit differently according to each unlock command. The following is a description of state switching of the display units according to each unlock command.

FIG. 1a illustrates state switching of the display units associated with an unlock command when the state of the first display unit is switched from the locked state 1 to the active state 5 and the state of the second display unit is maintained in the locked state 1. The first display unit may be switched from the locked state 1 to the active state 5 and at least one of a light emitting element and a touch sensor of the first display unit may be activated. The second display unit may be maintained in the locked state 1 and a light emitting element and a touch sensor of the second display unit may be maintained in the current states. Accordingly, for FIG. 1a, the portable device may display and provide content to the user and execute and provide an application to the user using the first display unit.

Figure 1B:
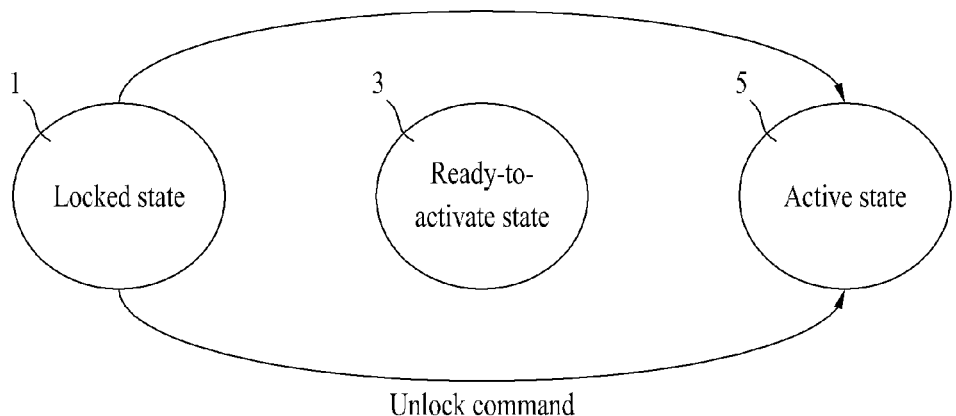

FIG. 1b illustrates state switching of the display units associated with an unlock command when the states of the first display unit and the second display unit are switched from the locked state 1 to the active state 5.

The first display unit and the second display unit may be switched from the locked state 1 to the active state 5 and at least one of the light emitting element and the touch sensor of each of the first display unit and the second display unit may be activated. Accordingly, the portable device may display and provide content to the user and execute and provide an application to the user using the first display unit and the second display unit. However, the first and second display units cannot be simultaneously exposed to the eyes of the user since the first and second display units are directed in opposite directions. Accordingly, when both the first and second display units are activated through one unlock command, one of the first and second display units, which is not exposed to the eyes of the user, may unnecessarily consume power or may cause erroneous operation by unintended touch.

Figure 1C:
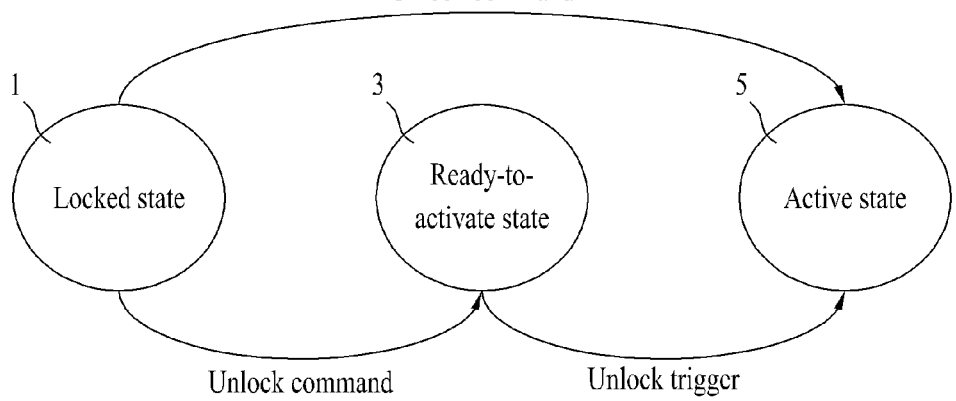

FIG. 1c illustrates state switching of the display units associated with an unlock command when the state of the first display unit is switched from the locked state 1 to the active state 5 and the state of the second display unit is switched from the locked state 1 to the ready-to-activate state 3.

The first display unit may be switched from the locked state 1 to the active state 5 and at least one of the light emitting element and the touch sensor of the first display unit may be activated. As described above, the portable device may display and provide content to the user and execute and provide an application to the user using the first display unit.

At least one of the light emitting element and the touch sensor of the second display unit which has been switched to the ready-to-activate state 3 is in an inactive state. Here, similar to the locked state, the portable device is in a state before providing an application or content to the user through the second display unit. However, unlike the locked state, the portable device is in a state in which the portable device can be switched to an active state when an unlock command is detected. The portable device may partially activate the light emitting element or the touch sensor of the second display unit in order to detect an unlock trigger or to inform the user of how to input an unlock trigger.

Figure 2A:
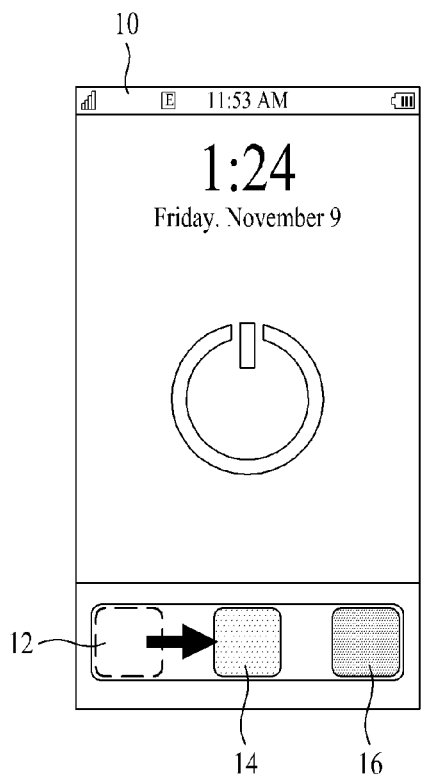
FIGS. 2a and 2b illustrate an unlock command of a portable device according to an embodiment of the present invention.

FIG. 2 illustrates an unlock command of a portable device according to an embodiment of the present invention. Specifically, FIG. 2a illustrates a situation in which a command to unlock the first display unit, which is in a locked state, is input through one slide bar located at the first display unit. The portable device 10 can discriminate a plurality of unlock commands based on a region where a user touch input is detected. That is, the portable device 10 may identify and detect one of the three unlock commands described above with reference to FIG. 1.

In the following, an unlock command which is to switch the state of the first display unit to an active state and to maintain the state of the second display unit in a locked state is defined as a first unlock command. In addition, an unlock command which is to switch the state of the first display unit to an active state and to switch the state of the second display unit to a ready-to-activate state is defined as a second unlock command. Further, an unlock command which is to switch the states of the first and second display units to an active state is defined as a third unlock command.

In an embodiment of the present invention, the portable device can determine whether the unlock command is the first unlock command, the second unlock command, or the third unlock command according to a region where touch input is detected. The following is a description of an embodiment associated with the first and second unlock commands. Of course, the following embodiment can be extended to the third unlock command.

When an unlock tab 12 located in a dotted portion in FIG. 2a is moved only to the center of the slide bar through touch input (as denoted by "14" in FIG. 2a), the portable device may determine that the input command is the first unlock command and may then switch the state of the first display unit to an active state. The portable device 10 may provide an application using the first display unit which is in an active state and the second display unit may be maintained in a locked state.

When the unlock tab 12 located in a dotted portion in FIG. 2a is moved to near a right boundary of the slide bar through touch input (as denoted by "16" in FIG. 2a), the portable device may determine that the input command is the second unlock command and may then switch the state of the first display unit to an active state and switch the state of the second display unit to a ready-to-activate state. This allows the portable device 10 to switch the state of the second display unit to an active state upon detection of an unlock trigger while providing an application and content through the first display unit.

Figure 2B:
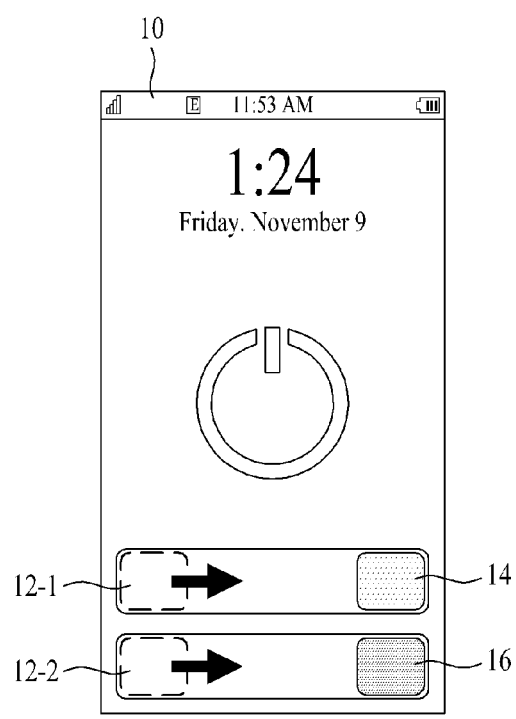

FIG. 2b illustrates a method for detecting an unlock command using two slides located on the first display unit. When an unlock tab 12-1 located in a dotted portion of the upper slide bar is slid through touch input (as denoted by "14"), the portable device may determine that the input command is the first unlock command and may then switch the state of the first display unit to an active state. The portable device 10 may provide an application using the first display unit that is in an active state. Here, the second display unit may be maintained in a locked state.

When the unlock tab 12-2 located in a dotted portion of the lower slide bar in FIG. 2*b* is slid through touch input (as denoted by "16" in FIG. 2*b*), the portable device 10 may determine that the input command is the second unlock command and may then switch the state of the first display unit to an active state and switch the state of the second display unit to a ready-to-activate state. This allows the portable device 10 to switch the state of the second display unit to an active state upon detection of an unlock trigger while providing an application and content through the first display unit. The unlock trigger will be described later in detail with reference to FIG. 5.

Next, FIG. 3 illustrates an unlock command of a portable device according to another embodiment of the present invention. The portable device 10 according to an embodiment of the present invention may identify and detect the position and direction of a touch input from the user and may execute an unlock command corresponding to the detected position and direction. The portable device 10 may display a position-variable unlock tab adaptively according to a touch input of the user. In more detail, when the user touches a left region of the slide bar as shown in FIG. 3*a*, the portable device may generate an unlock tab 18-1 in the left region of the slide bar. When the unlock tab 18-1 is slid to the right region through touch input, the portable device may identify this as the first unlock command and may switch the state of the first display unit to an active state. The portable device may provide content, an application, or the like using the first display unit. Here, the second display unit may be maintained in a locked state.

When the user touches a right region of the slide bar as shown in FIG. 3*b*, an unlock tab 18-2 may be generated in the right region of the slide bar. When the unlock tab 18-2 is slid to the left region through touch input, the portable device may identify this as the second unlock command and may switch the state of the first display unit to an active state and switch the state of the second display unit to a ready-to-activate state. The first display unit which is in an active state may activate at least one of the light emitting element and the touch sensor of the first display unit. The leftward and rightward unlock directions of the position-variable unlock tabs described above may be reversed and the rightward and leftward sliding directions of the position-variable unlock tab, which define the first and second unlock commands, may also be reversed according to an embodiment. That is, the portable device may detect an unlock command as the second unlock command when the unlock command is input in a rightward direction as shown in FIG. 3*a* and may detect an unlock command as the first unlock command when the unlock command is input in a leftward direction as shown in FIG. 3*b*.

Accordingly, the portable device 10 of the present invention may identify and detect the direction of a touch input of the user and may switch only the first display unit to an active state or may switch the first display unit to an active state and switch the second display unit to a ready-to-activate state according to the detected direction.

In addition, in the example of FIGS. 3*a* and 3*b*, when the portable device 10 simultaneously detects a touch input on the unlock tab 18-1 displayed on the first display unit and a touch input on a corresponding region of the second display unit which is located at the opposite side to the unlock tab 18-1 and then detects that the unlock tab 18-1 is slid to the right region through the touch input as described above, the portable device may identify this as the second unlock command regardless of the sliding direction of the unlock touch input. For example, this corresponds to when the user performs an unlock touch input on each of the first display unit and the second display unit using a thumb and an index finger with the same hand form as shown in FIGS. 3*a* and 3*b*.

That is, the portable device 10 may detect an unlock touch input as the first unlock command when the unlock touch input is detected only on the first display unit and may detect an unlock touch input as the second unlock command when the unlock touch input is simultaneously detected on the first and second display units, regardless of the sliding direction of the unlock touch input.

Figure 4A:
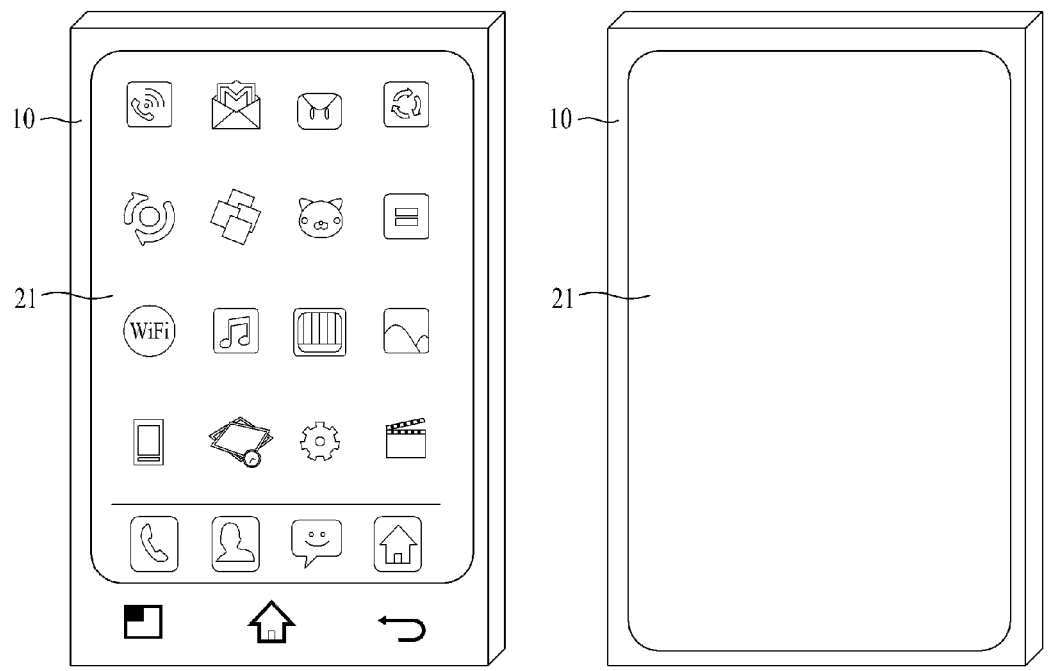
FIGS. 4a and 4b illustrate a locked state and an unlocked state of a portable device according to an embodiment of the present invention.

FIG. 4 illustrates a locked state, a ready-to-activate state, and an active state of a portable device according to an embodiment of the present invention. Specifically, FIG. 4*a* illustrates when a touch sensor of a first display unit 21 of a portable device 10 senses an unlock command such that the state of the first display unit 21 is switched to an active state and the state of the second display unit 22 is maintained in a locked state or a ready-to-activate state. That is, this is when the first unlock command or the second unlock command described above with reference to FIG. 2 is detected. The light emitting element and the touch sensor of the first display unit 21 may be activated to sense user touch or to display content and execute an application.

The portable device 10 may maintain at least one of the light emitting element and the touch sensor of the second display unit 22, which is in a locked state or a ready-to-activate state, in an inactive state. That is, the portable device 10 may activate only the light emitting element of the second display unit while maintaining the touch sensor in an inactive state or may activate only the touch sensor while maintaining the light emitting element in an inactive state. The portable device 10 may also maintain both the light emitting element and the touch sensor in an inactive state.

Accordingly, the portable device 10 can reduce power consumed by the second display unit 22, thereby achieving power saving effects. The portable device 10 can also prevent detection of an unintended touch input by the touch sensor of the second display unit 22.

Figure 4B:
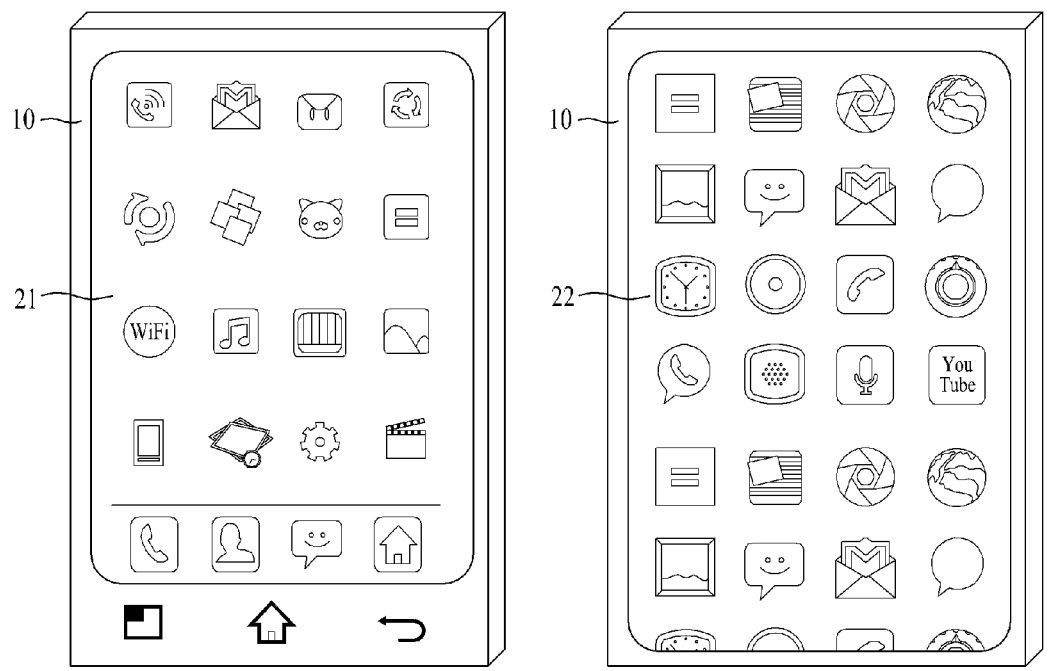

FIG. 4*b* illustrates when the states of the first and second display units 21 and 22 are switched to an active state. When the portable device 10 has detected an unlock trigger after detecting the second unlock command or has detected the third unlock command, the state of each of the first and second display units 21 and 22 is switched to an active state. Unlock trigger types will be described later in detail with reference to FIG. 5.

When the first and second display units 21 and 22 are in an active state, icons of applications may be arranged on the first and second display units 21 and 22 and each of the display units may sense user touch or display content and may execute an application. According to an embodiment of the present invention, different icons may be displayed and arranged on the first and second display units 21 and 22 at positions preset by the user.

According to another embodiment of the present invention, the same icons may be displayed on the first and second display units. Accordingly, when the front and rear surfaces of the portable device 10 are identical such that it is difficult to discriminate between the front and rear surfaces, the portable device 10 can provide the same user environment, regardless of whether the user uses the first display unit or the second display unit.

Next, FIG. 5 illustrates an unlock trigger according to an embodiment of the present invention. As described above, when the second unlock command is detected, the portable device of the present invention may switch the state of the first display unit to an active state and switch the state of the second display unit to a ready-to-activate state and may then switch the state of the second display unit to an active state when an unlock trigger for the second display unit is detected. Here, the unlock trigger may be a trigger for switching a display unit, which is in a ready-to-activate state, to an active state.

Figure 5A:
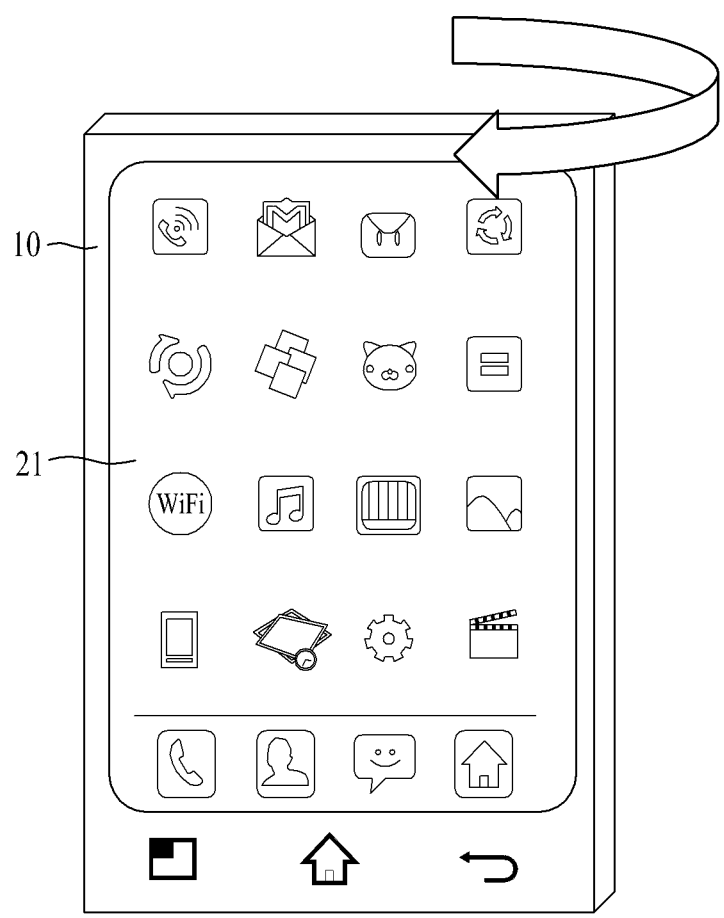
FIGS. 5a and 5b illustrate an unlock trigger according to an embodiment of the present invention.

In an example of FIG. 5a, the portable device 10 may detect rotation, movement, overturning, or the like and may identify such rotation, movement, or overturning as an unlock trigger. When the portable device 10 is rotated, moved, or overturned such that the second display unit faces the user, the portable device 10 may detect such rotation, movement, or overturning as an unlock trigger and may then switch the state of the second display unit to an active state. Detection of the unlock trigger may be performed using at least one of a touch sensor, a gravity sensor, a motion sensor, a gyro sensor, an acceleration sensor, an inclination sensor, and a brightness sensor. Switching of a display unit to an active state may include activating at least one of a light emitting element and a touch sensor of the display unit.

However, while the portable device 10 detects rotation, the portable device 10 may deactivate at least one of a light emitting element and a touch sensor of each of the first and second display units. In this instance, even when an unlock trigger is detected, the portable device may temporarily deactivate each touch sensor to prevent detection of a touch input unintended by the user while the portable device is rotating. Here, the portable device 10 may deactivate the touch sensors of the first and second display units at different times.

In addition, when the portable device rotates, the portable device may deactivate a display unit that is not exposed to the eyes of the user. That is, in FIG. 5a, the portable device may deactivate the first display unit 21 to achieve power saving effects since the first display unit 21 is not exposed to the eyes of the user due to rotation of the portable device. When the portable device rotates, the light emitting element of the second display unit 22 may be activated to provide corresponding information to the user. That is, upon detecting rotation of the portable device, the portable device may activate the light emitting element of the second display unit to provide corresponding information to the user. The portable device may activate the touch sensor of the second display unit after the portable device completes rotation.

Figure 5B:
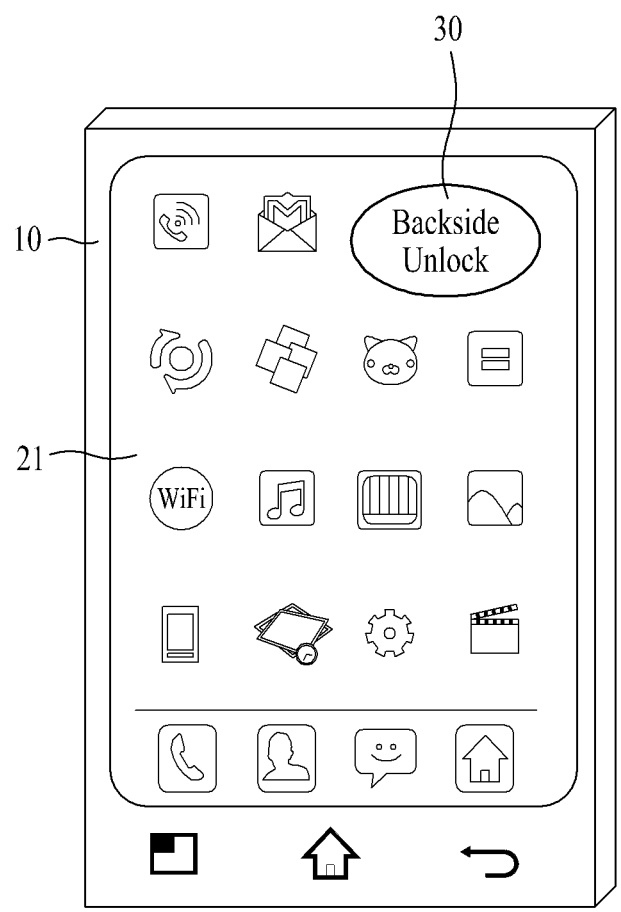

FIG. 5b illustrates a method for detecting a touch input performed for a first display unit as an unlock trigger. The portable device 10 may display an unlock interface 30 for switching the state of the second display unit to an active state on a specific region of the first display unit 21. A touch input performed on the unlock interface 30 may be detected as an unlock trigger for switching the state of the second display unit to an active state. When a touch input performed on the unlock interface 30 is detected, the portable device 10 may activate at least one of the light emitting element and the touch sensor of the second display unit to switch the state of the second display unit to an active state.

When the state of the second display unit has been switched to an active state, the displayed unlock interface 30 may be used as a lock interface. When a touch input performed on the unlock interface 30 is detected after the second display unit is activated, the portable device 10 may switch the state of the second display unit to a ready-to-activate state. Accordingly, the portable device 10 may deactivate at least one of the light emitting element and the touch sensor of the second display unit.

Figure 6:
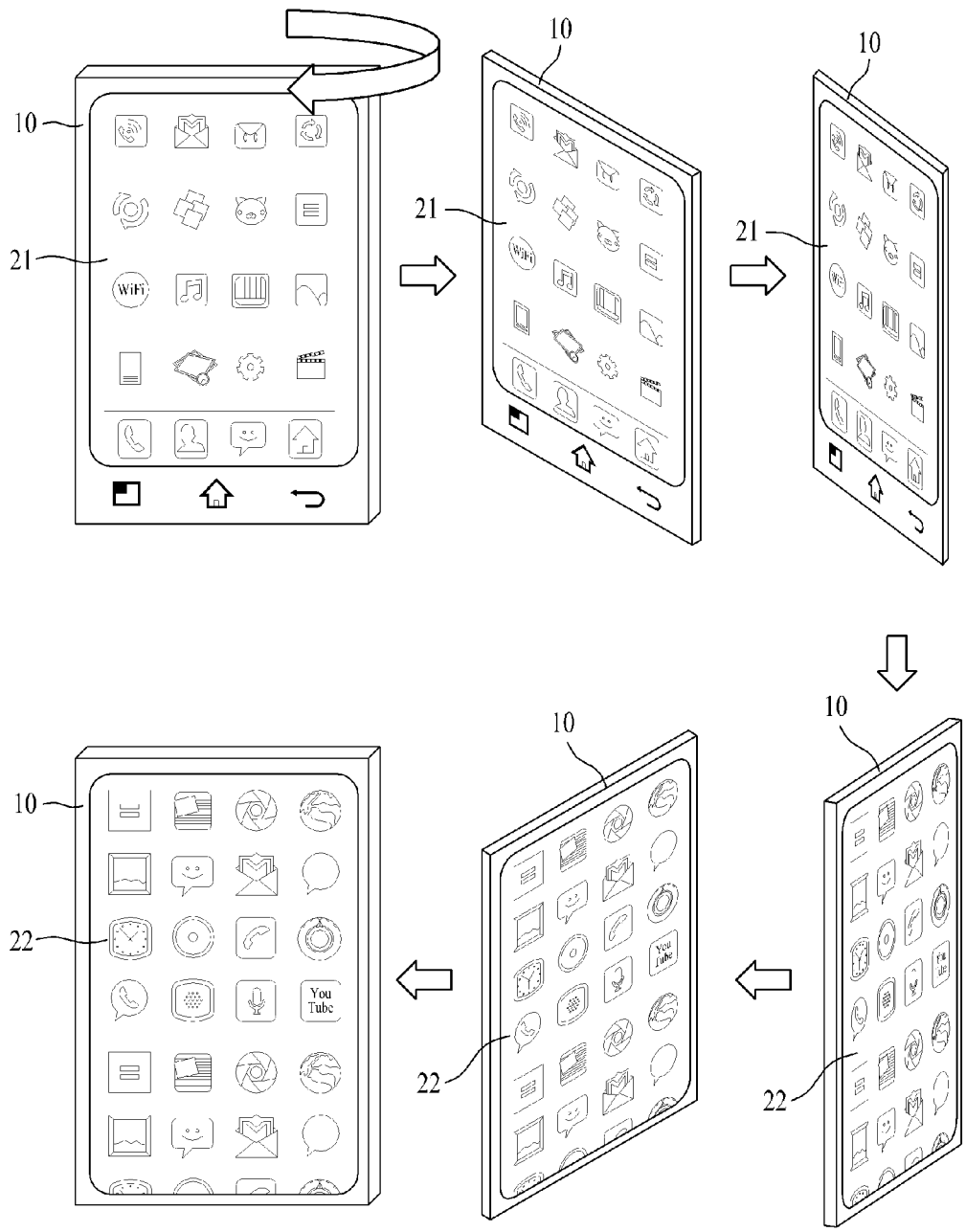
FIG. 6 illustrates a method for performing unlocking according to rotation of a portable device according to an embodiment of the present invention.

Next, FIG. 6 illustrates a method for performing unlocking according to rotation of a portable device according to an embodiment of the present invention. As described above with reference to FIG. 5a, the portable device 10 may detect rotation, movement, overturning, or the like and may identify such rotation, movement, or overturning as an unlock trigger. In the example of FIG. 6, when the portable device 10 has detected a second unlock command before the portable device 10 rotates, the portable device 10 may switch the state of the first display unit 21 to an active state and may switch the state of the second display unit 22 to a ready-to-activate state. When rotation is detected, the portable device 10 may identify the detected rotation as an unlock trigger for the second display unit 22 and may then switch the state of the second display unit 22 to an active state.

The portable device 10 may sequentially perform state switching of the second display unit 22 according to the rotated angle. Specifically, the portable device 10 may activate the light emitting element of the second display unit 22 when the rotated angle is a first threshold angle and may activate the touch sensor of the second display unit 22 when the rotated angle is a second threshold angle. Here, the second threshold angle may be equal to or greater than the first threshold angle.

If the first threshold angle is stored as 45 degrees and the second threshold angle is stored as 180 degrees in the portable device 10, the light emitting element of the second display unit 22 may be activated when the portable device has been rotated by 45 degrees and the touch sensor of the second display unit 22 may be activated when the portable device has been rotated by 180 degrees. In this manner, the light emitting element and the touch sensor of the second display unit 22 may be activated at different times.

Through such operations, the portable device 10 can preferentially activate the light emitting element of the second display unit 22 to continuously provide content to the user and can thereafter activate the touch sensor of the second display unit 22 to prevent erroneous operation caused by unintended touch input. Since the first display unit 21 is hidden from the eyes of user as the portable device 10 rotates, the first display unit 21 may switch the state of the first display unit 21 to a ready-to-activate state.

The portable device 10 may deactivate at least one of the light emitting element and the touch sensor of the first display unit 21 according to the rotated angle. The light emitting element of the first display unit 21 may be deactivated to reduce power consumption and the touch sensor may be deactivated to prevent erroneous operation caused by unintended touch input.

The portable device 10 may sequentially perform state switching of the first display unit 21 to a ready-to-activate state according to the rotated angle. That is, the touch sensor of the first display unit 21 may be deactivated when the rotated angle is a third threshold angle and the light emitting element of the first display unit 21 may be deactivated when the rotated angle is a fourth threshold angle. Here, the fourth threshold angle may be equal to or greater than the third threshold angle.

Through such operations, the portable device 10 can preferentially deactivate the touch sensor of the first display unit 21 to prevent erroneous operation caused by unintended touch input. In addition, the first display unit 21 may be deactivated to reduce power consumption, thereby achieving power saving effects. Switching of the first display unit 21 to a ready-to-activate state may be optional and may not be applied to the portable device according to an implementation method thereof.

Figure 7A:
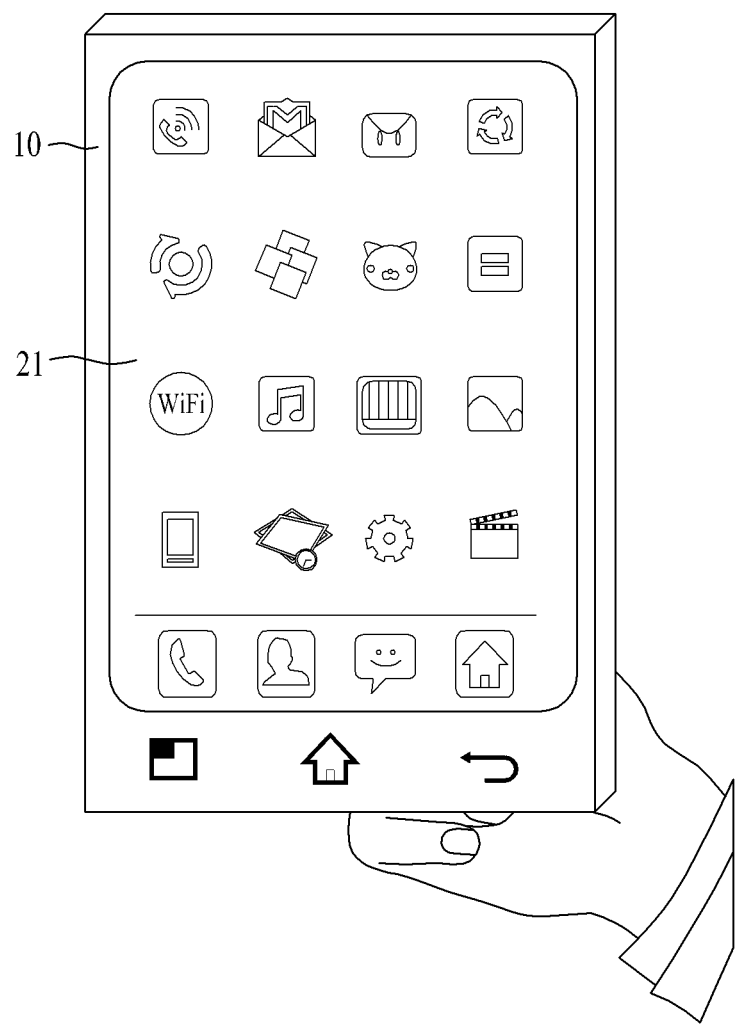
FIGS. 7a and 7b illustrate an unlock trigger according to another embodiment of the present invention.

FIG. 7 illustrates an unlock trigger according to another embodiment of the present invention. FIG. 7a illustrates a method for detecting touch input sensed by the touch sensor of the second display unit as an unlock trigger.

In order to use a touch input performed on the second display unit as an unlock trigger, the portable device 10 may activate the touch sensor of the second display unit which is in a ready-to-activate state. Accordingly, the touch sensor of the second display unit may be activated to detect a touch input performed on the second display unit as an unlock trigger.

The portable device 10 may activate the touch sensor only on a specific portion of the second display unit taking into consideration the grip form of the user and may sense a touch input performed on the specific portion through the touch sensor and detect the touch input as an unlock trigger. A touch input identified as an unlock trigger may include a specific pattern such that the state of the second display unit may be switched to an active state only when the identified touch input pattern matches a specific pattern stored in the portable device.

The portable device 10 may activate the light emitting element and the touch sensor of the second display unit when the state of the second display unit has been switched to an active state. The portable device may activate the touch sensor on an entire area of the second display unit including the specific portion described above.

Figure 7B:
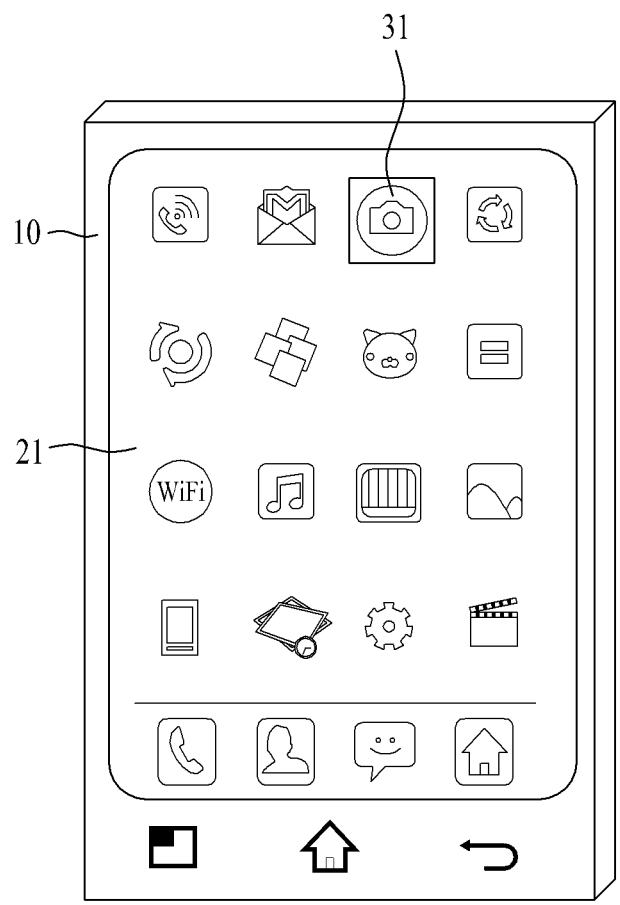

FIG. 7b illustrates a method for detecting a command to execute an application as an unlock trigger. The portable device 10 may detect a command to execute an application as an unlock trigger. An application 31 included in the portable device 10 may use double-sided display units. That is, when the application 31 is executed, the portable device 10 may activate at least one of the light emitting element and the touch sensor of the second display unit in conjunction with the first display unit. The portable device 10 may activate at least one of the light emitting element and the touch sensor of the second display unit according to control of the application. An embodiment of this method will be described below with reference to FIG. 8.

When the application is terminated, the portable device 10 may deactivate at least one of the light emitting element and the touch sensor of the second display unit which have been activated. That is, the state of the second display unit may be switched to a ready-to-activate state. Through this method, it is possible to selectively switch the second display unit to an active state or to a ready-to-activate state as the application is executed and terminated.

The portable device 10 may detect user gesture or voice as well as the unlock trigger described above as an unlock trigger or may detect clicking on a hardware button or a touch input performed by a stylus as an unlock trigger.

Figure 8:
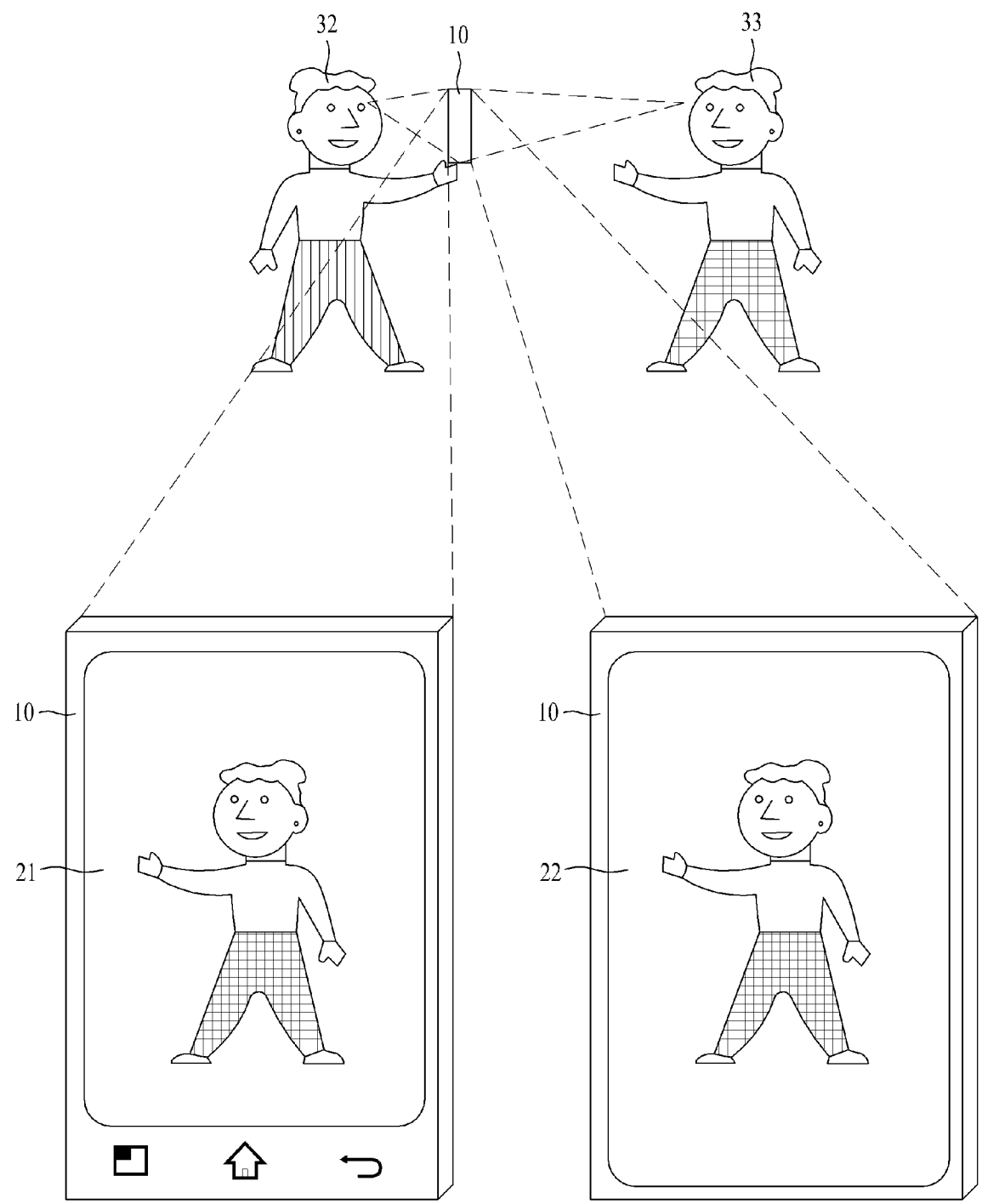
FIG. 8 illustrates a method for detecting a command to execute a camera application as an unlock trigger according to an embodiment of the present invention.

FIG. 8 illustrates a method for detecting a command to execute a camera application as an unlock trigger according to an embodiment of the present invention. When the camera application included in the portable device 10 is executed, the portable device 10 may detect execution of the camera application as an unlock trigger and switch the state of the second display unit to an active state. Accordingly, at least one of the light emitting element and the touch sensor of the second display unit may be activated.

The portable device may display a subject 33 on the first display unit 21 which faces a user 32 which is a photographer to allow the user 32 to check a preview image of a photograph of the subject in real time. The portable device 10 may also display the subject 33 on the second display unit 22 whose light emitting element has been activated to allow the subject 33 to check a preview image of their own figure through the second display unit 22. Accordingly, both the person 32 which takes a photograph and the subject 33 whose photograph is to be taken can simultaneously check the preview image to allow them to take a photograph having a desired composition. The portable device 10 may activate the touch sensor of the second display unit 22 that has been activated to allow the subject 33 to take their own photograph through touch input. That is, the subject 33 may check their own figure through the second display unit 22 and touch the second display unit 22 to take a photograph at a desired composition and timing.

Figure 9A:
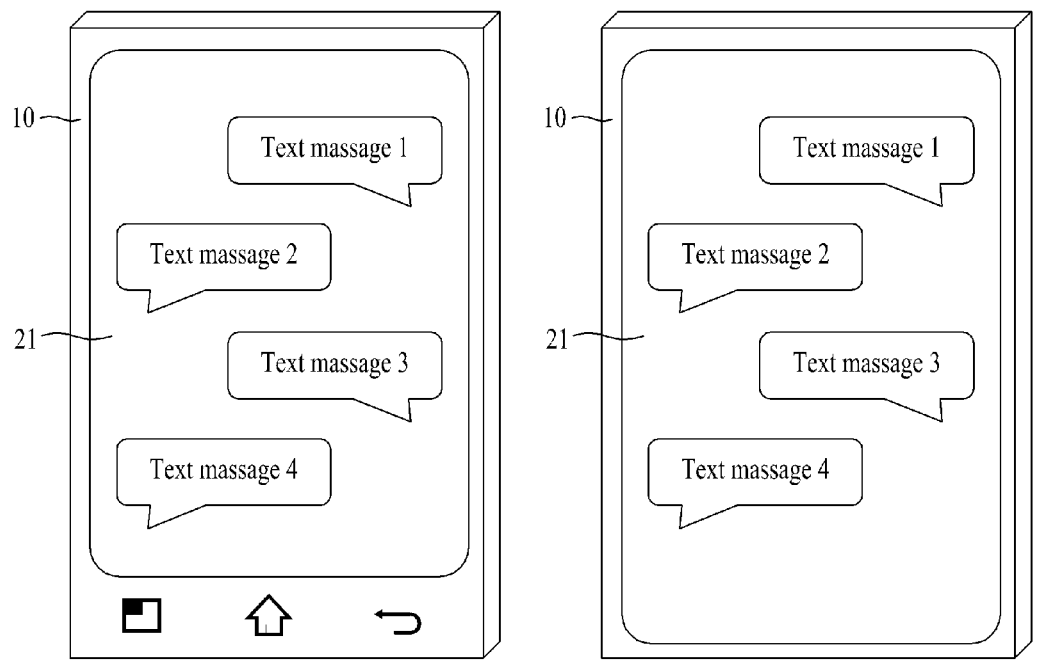
FIGS. 9a and 9b illustrate content that is displayed through an unlock trigger according to an embodiment of the present invention.

Next, FIG. 9 illustrates content that is displayed through an unlock trigger according to an embodiment of the present invention. In the example of FIG. 9a, when the state of the second display unit 22 has been switched to an active state through an unlock trigger, the portable device 10 may display the same content as that displayed on the first display unit 21 on the second display unit 22. For example, upon detecting an unlock trigger while a text message is displayed on the first display unit 21, the portable device 10 may display the same text message on the second display unit 22.

This operation may be used when a user, who is using content through the first display unit 21, desires to share the content with another user at the opposite side. That is, the portable device 10 may display the same content on the first and second display units 21 and 22 to provide the same content to a plurality of users. Accordingly, the portable device 10 can continuously provide content to a user who is using content through the first display unit 21 while simultaneously providing the content to another user, with whom the user desires to share the content, through the second display unit 22.

Figure 9B:
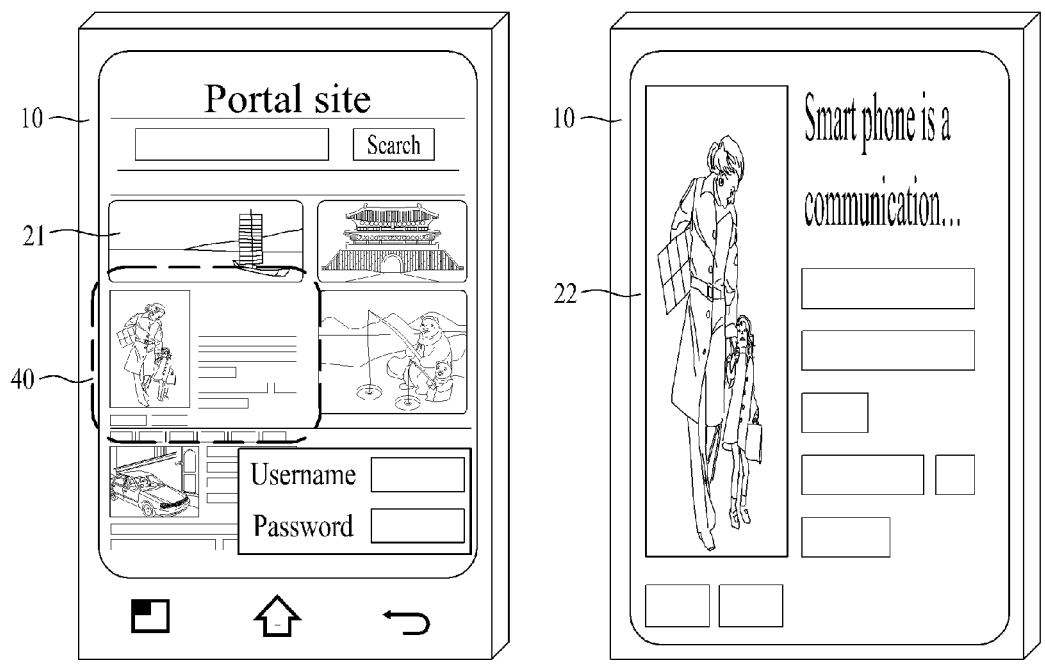

In an example of FIG. 9b, when the second display unit 22 has been activated through an unlock trigger, the portable device 10 may display detailed content linked with content displayed on the first display unit 21 on the second display unit 22.

For example, this operation is performed when the user has selected specific content 40, which is linked with detailed content, on a webpage displayed on the first display unit 21. When the user has selected the specific content 40, the portable device 10 may display the detailed content linked with the specific content 40. When an unlock trigger is detected after the detailed content is displayed on the first display unit 21, the portable device 10 may display the detailed content on the second display unit 22. When the detailed content is moved to and displayed on the second display unit 22, the portable device 10 may again display the webpage, which was being displayed before the detailed content, on the first display unit 21.

If the second display unit 22 is in an active state when the user selects the specific content 40, the portable device 10 may directly display the detailed content linked with the specific content 40 on the second display unit 22 rather than displaying the detailed content on the first display unit 21.

Since the portable device 10 displays the detailed content, which is linked with the specific content 40 on the webpage displayed on the first display unit 21, on the second display unit 22 as described above, there is an advantage in that it is possible to use the detailed content through the second display unit 22 while allowing the webpage to be continuously used through the first display unit 21.

Figure 10A:
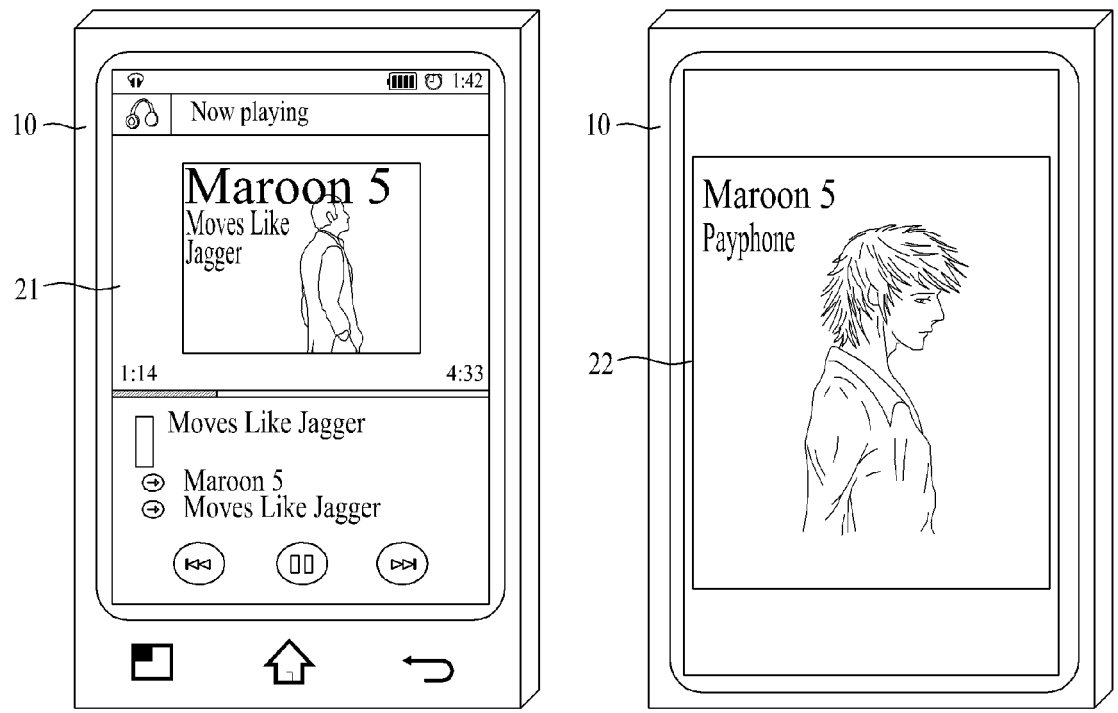
FIGS. 10a and 10b illustrate content that is displayed through an unlock trigger according to another embodiment of the present invention.

FIG. 10 illustrates content that is displayed through an unlock trigger according to another embodiment of the present invention. In the example of FIG. 10a, when the state of the second display unit 22 has been switched from an active state through an unlock trigger, the portable device 10 may display content associated with content displayed on the first display unit 21 on the second display unit 22.

For example, this operation is performed when the portable device 10 reproduces multimedia content on the first display unit 21. The portable device 10 may download information associated with the multimedia content through a network and display the downloaded information on the second display unit 22. The portable device 10 may extract data associated with the multimedia content that is being reproduced from data stored in the portable device 10 and may display the extracted data on the second display unit 22. This allows the portable device 10 to provide additional information associated with the multimedia content to the user through the second display unit 22 while continuously reproducing the multimedia content through the first display unit 21.

When a movie is being played on the first display unit 21 of the portable device 10, additional information such as information regarding actors in the movie, information regarding a director, information regarding other movies of the same director, information regarding soundtrack, information regarding film series of the movie, information regarding a producer, information regarding a production company, and information regarding film locations may be displayed on the second display unit 22.

When music is being played on the first display unit 21 of the portable device 10, additional information such as information regarding a composer and a lyric writer, information regarding a singer, information regarding other albums of the singer, information regarding other content using the music, and information regarding an album that contains the music may be displayed on the second display unit 22.

Since the portable device 10 displays content associated with multimedia content, which is being viewed by the user, on the second display unit 22, there is an advantage in that it is possible to additional information to the user.

Figure 10B:
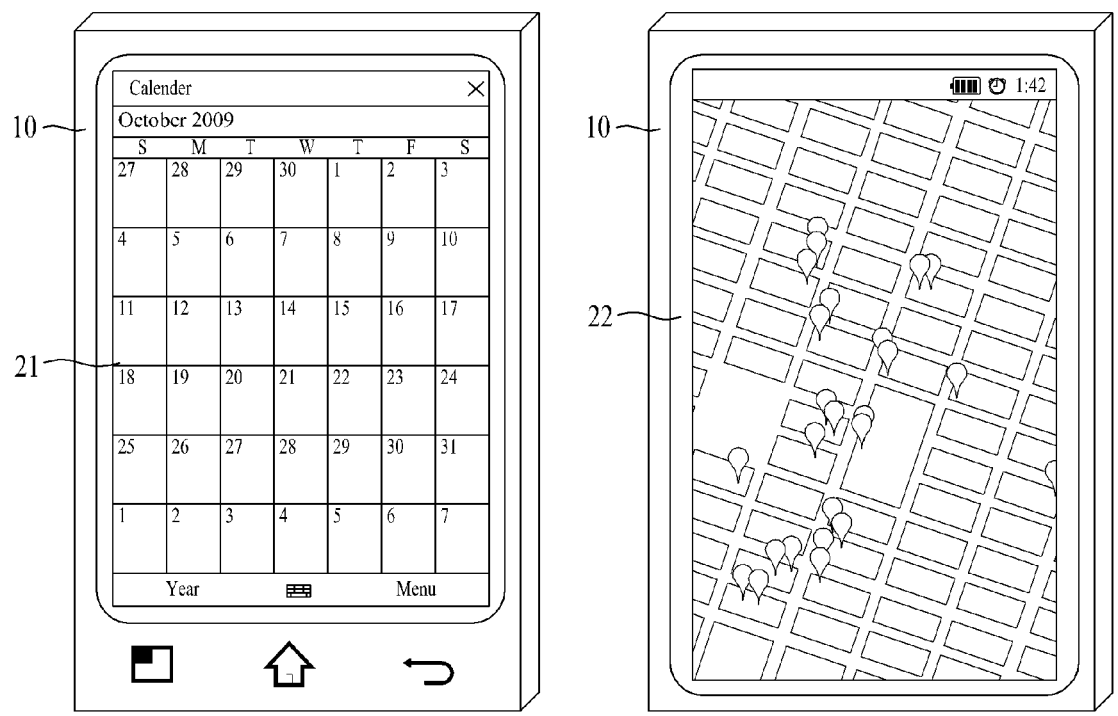

In the example of FIG. 10b, the portable device 10 may control the second display unit 22 independently of the first display unit 21 when the state of the second display unit 22 has been switched to an active state through an unlock trigger. For example, in the example of FIG. 10b, the portable device 10 may display a calendar on the first display unit 21 and may display a map application on the second display unit 22. The portable device 10 may control the first display unit 21 and the second display unit 22 independently of each other. This allows the user to independently execute two applications, which low relevance with each other, on the respective display units.

When the two applications are independently executed on the respective display units, a series of processes are performed in the following manner. When the portable device 10 has detected a second unlock command, the portable device 10 may switch the state of the first display unit 21 to an active state and switch the state of the second display unit 22 to a ready-to-activate state. The portable device 10 may provide an application through the first display unit 21. Then, when an unlock trigger is detected, the portable device 10 may switch the state of the second display unit 22 to an active state. The portable device 10 may activate at least one of the light emitting element and the touch sensor of the second display unit 22. Here, the portable device 10 may arrange application icons on the second display unit 22 as shown in FIG. 4b and may execute a selected application on the second display unit 22 to provide the application to the second display unit 22 independently of an application executed on the first display unit 21.

Thus, the portable device can improve user convenience by providing two independent display units to the user in the above manner.

Figure 11:
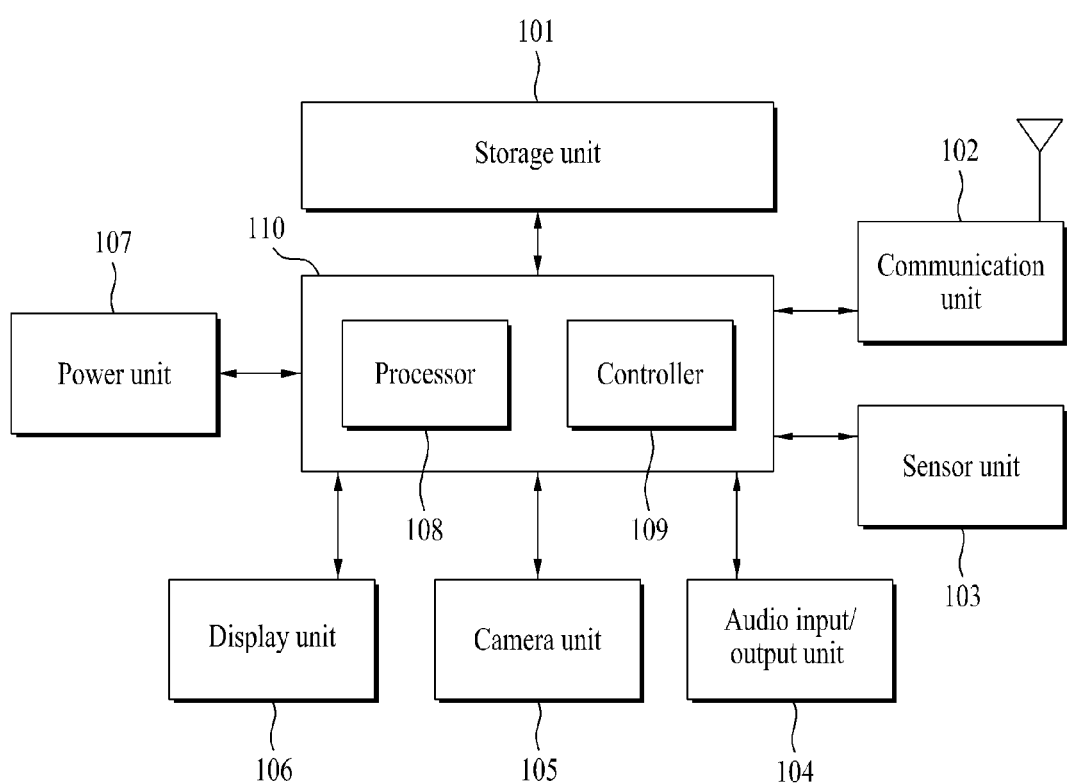
FIG. 11 is a block diagram of a portable device according to an embodiment of the present invention.

Next, FIG. 11 is a block diagram of a portable device according to an embodiment of the present invention. As shown in FIG. 11, the portable device includes a storage unit 101, a communication unit 102, a sensor unit 103, an audio input/output unit 104, a camera unit 105, a display unit 106, a power unit 107, a processor 108, and a controller 109.

The storage unit 101 may store various digital data such as video, audio, photographs, moving images, and applications. The storage unit 101 may be various digital data storage spaces such as a flash memory, a Hard Disk Drive (HDD), or a Solid State Drive (SSD). The portable device of the present invention may extract content associated with content displayed on the first display unit and display the extracted content on the second display unit. The storage unit 101 may be an optional element depending on the design of the portable device.

The communication unit 102 may perform communication and data transmission/reception with the outside of the portable device using various protocols. The communication unit 102 may connect to an external network by wire or wirelessly to transmit and/or receive digital data. The portable device of the present invention may receive content associated with content displayed on the first display unit through a network and display the received content on the second display unit. The communication unit 102 may be an optional element depending on the design of the portable device.

The sensor unit 103 may deliver an environment detected by the portable device or a user input sensed using a plurality of sensors provided on the portable device to the controller 109. The sensor unit 103 may include a plurality of sensing means. In an embodiment, the plurality of sensing means may include sensing means such as a gravity sensor, a geo-magnetic sensor, a motion sensor, a gyro sensor, an acceleration sensor, an inclination sensor, a brightness sensor, an altitude sensor, a smell sensor, a temperature sensor, a depth sensor, a pressure sensor, a bending sensor, an audio sensor, a video sensor, a Global Positioning System (GPS) sensor, and a touch sensor. In the present invention, the sensor unit 103 may detect an unlock command and an unlock trigger to unlock the first display unit and the second display unit as described above with reference to FIG. 6. The sensor unit 103 may sense rotation of the portable device or a touch input through a display unit and may deliver the sensing result to the controller 109. The sensors described above may be included as individual elements in the portable device or may be integrated into at least one element and may then be included in the portable device.

The audio input/output unit 104 may include an audio output means such as a speaker and an audio input unit such as a microphone and may perform audio output from the portable device and audio input to the portable device. The audio input/output unit 104 may be used as an audio sensor. In the portable device of the present invention, the audio input/output unit may be an optional element.

The camera unit 105 may perform still and moving image capture and may be optionally provided according to an embodiment. The camera unit 105 may be used as a visual sensor or the motion sensor described above. The portable device may detect an unlock command using the camera until 105. The camera unit 105 may identify biometric information of the user, which may include the face, fingerprint, and iris of the user. In the portable device of the present invention, the camera unit 105 may be an optional element.

The display unit 106 may output an image to a screen. The display unit 106 may be used as the touch sensor described above when the display unit is a touch sensitive display. Accordingly, the display unit 106 may detect user input on the display unit 106 and may deliver the detected user input to the controller 109. The display unit 106 may function to display an image on a display panel or to control image display. The portable device of the present invention may include a plurality of display units 106. The display units 106 may be located at both surfaces of the portable device and may be divided into a first display unit located on the portable device at the user side and a second display unit located at the opposite side. The display units 106 may include a flexible display.

The power unit 107 may be a battery provided in the portable device or a power supply unit connected to an external power source and may supply power to the portable device. In the portable device of the present invention, the power unit may be an optional element. The processor 108 may execute various applications stored in the storage unit 101 and may process data in the portable device.

The controller 109 may control the units of the portable device and manage data transmission and reception between the units. The processor 108 and the controller 109 may be included in one chip 110 and may perform the operations described above in conjunction with each other. In this instance, the chip 110 may be referred to as a controller 109. In the present invention, when an unlock command is detected, the controller 109 may switch the state of each of the first display unit and the second display unit to one of a locked state, a ready-to-activate state, and an active state according to the detected unlock command.

In FIG. 11, which is a block diagram of the portable device according to one embodiment of the present invention, the separate blocks show the elements of the portable device as logically separated elements. Thus, the elements of the portable device may be provided as one chip or a plurality of chips according to the design of the portable device.

Figure 12:
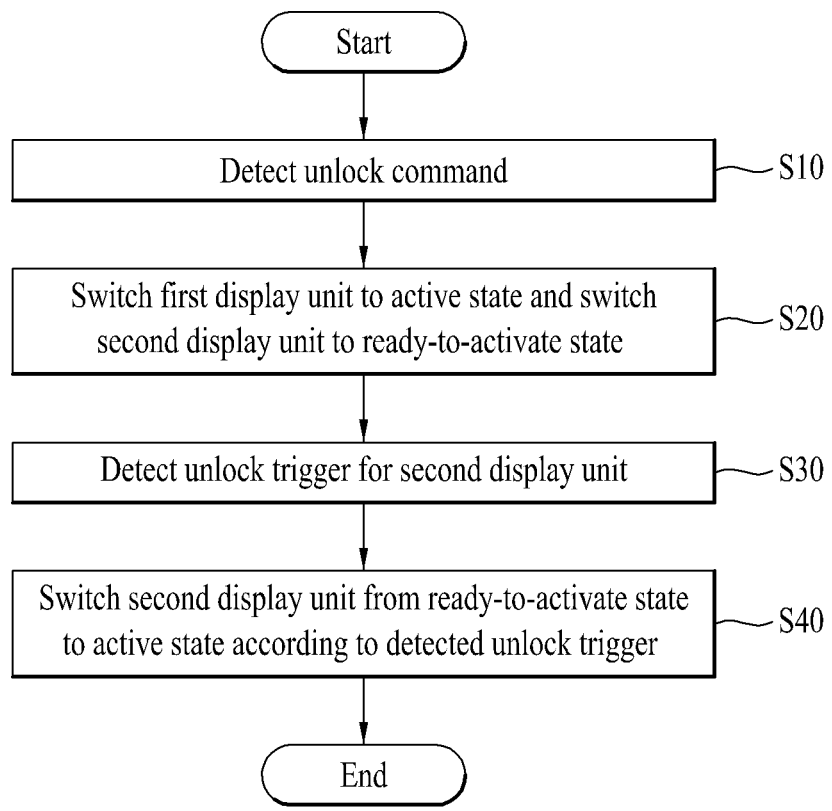
FIG. 12 illustrates a method for unlocking a display unit of a portable device according to an embodiment of the present invention.

FIG. 12 illustrates a method for unlocking a display unit of a portable device according to an embodiment of the present invention. The portable device according to the present invention may detect an unlock command (S10). As described above with reference to FIGS. 2 and 3, the portable device may identify and detect an unlock command. The portable device may detect an unlock command using the sensor unit or the camera unit and the detected unlock command may be provided to and executed by the controller. Such detection using the sensor unit may be performed using the motion sensor or the touch sensor of the display unit of the portable device. Detection using the sensor unit may be performed using a gravity sensor, a gyro sensor, an acceleration sensor, an inclination sensor, and a brightness sensor. Detection using the camera unit may be performed by identifying biometric information of the user through the camera unit. Here, the biometric information may include face, fingerprint, and iris information.

The portable device may determine whether the unlock command is the first unlock command, the second unlock command, or the third unlock command based on a display region where a touch input has been detected. When the second unlock command is detected, the portable device may switch the state of the first display unit to an active state and switch the state of the second display unit to a ready-to-activate state as described above with reference to FIG. 4*a* (S20). When the first display unit is in an active state, at least one of the light emitting element and the touch sensor of the first display unit may be activated according to an embodiment. The portable device may execute an application or provide content to the user using the first display unit that is in an active state.

The portable device may switch the state of the second display unit to a ready-to-activate state. Accordingly, the light emitting element and the touch sensor of the second display unit may be maintained in an inactive state.

In another embodiment of the present invention, when the portable device has detected a touch input on the second display unit as an unlock trigger, the portable device may activate the touch sensor of the second display unit which is a ready-to-activate state only for a specific portion of the second display unit as described above with reference to FIG. 7*a*.

The portable device may detect an unlock trigger for the second display unit after switching the state of the second display unit to a ready-to-activate state (S30). The ready-to-activate state may include rotation, movement, overturning, or the like of the portable device as described above with reference to FIGS. 5 to 8. These motions may be detected using at least one of the touch sensor, the gravity sensor, the motion sensor, the gyro sensor, the acceleration sensor, the inclination sensor, and the brightness sensor. A touch input on a displayed unlock interface, a touch input on a specific portion of the second display unit, execution of an application that operates in conjunction with the second display unit, or the like may be detected as an unlock trigger.

When an unlock trigger is detected, the portable device may switch the state of the second display unit to an active state (S40). The portable device may activate at least one of the light emitting element and the touch sensor of the second display unit.

In the step of detecting an unlock trigger, when rotation of the portable device is detected as an unlock trigger, the portable device may sequentially perform activation of the second display unit according to the rotated angle. That is, the portable device may activate the light emitting element of the second display unit when the rotated angle is a first threshold angle and activate the touch sensor of the second display unit when the rotated angle is a second threshold angle. Here, the second threshold angle may be equal to or greater than the first threshold angle. The portable device may switch the state of the first display unit to a ready-to-activate state while activating the second display unit. That is, the portable device may deactivate at least one of the light emitting element and the touch sensor of the first display unit. This allows the portable device to reduce unnecessary power consumption by the first display unit and erroneous operation caused by unintended touch.

In the step of detecting an unlock trigger, when execution of an application that operates in conjunction with the second display unit is detected as an unlock trigger, the portable device may switch the state of the second display unit to an active state upon execution of the application. In this case, the portable device may activate at least one of the light emitting element and the touch sensor of the second display unit and the second display unit may be maintained in an active state while the application is executed. When the application is terminated, the portable device may switch the state of the second display unit to a ready-to-activate state and deactivate at least one of the light emitting element and the touch sensor of the second display unit.

As described above with reference to FIGS. 9 and 10, content identical to or associated with content displayed on the first display unit may be displayed on the second display unit which is in an active state and the associated content may be extracted from the portable device or may be received through a network and may then be displayed on the second display unit. In another embodiment, the portable device may control the second display unit independently of the first display unit and may display two applications or content items, which have low relevance with each other, respectively on the first and second display units.

Since the portable device of the present invention switches the state of the second display unit to an active state according to an unlock trigger after switching the state of the second display unit to a ready-to-activate state in response to an unlock command as described above, there is an advantage in that it is possible to achieve power saving and to prevent erroneous operation caused by unintended touch input.

Figure 13:
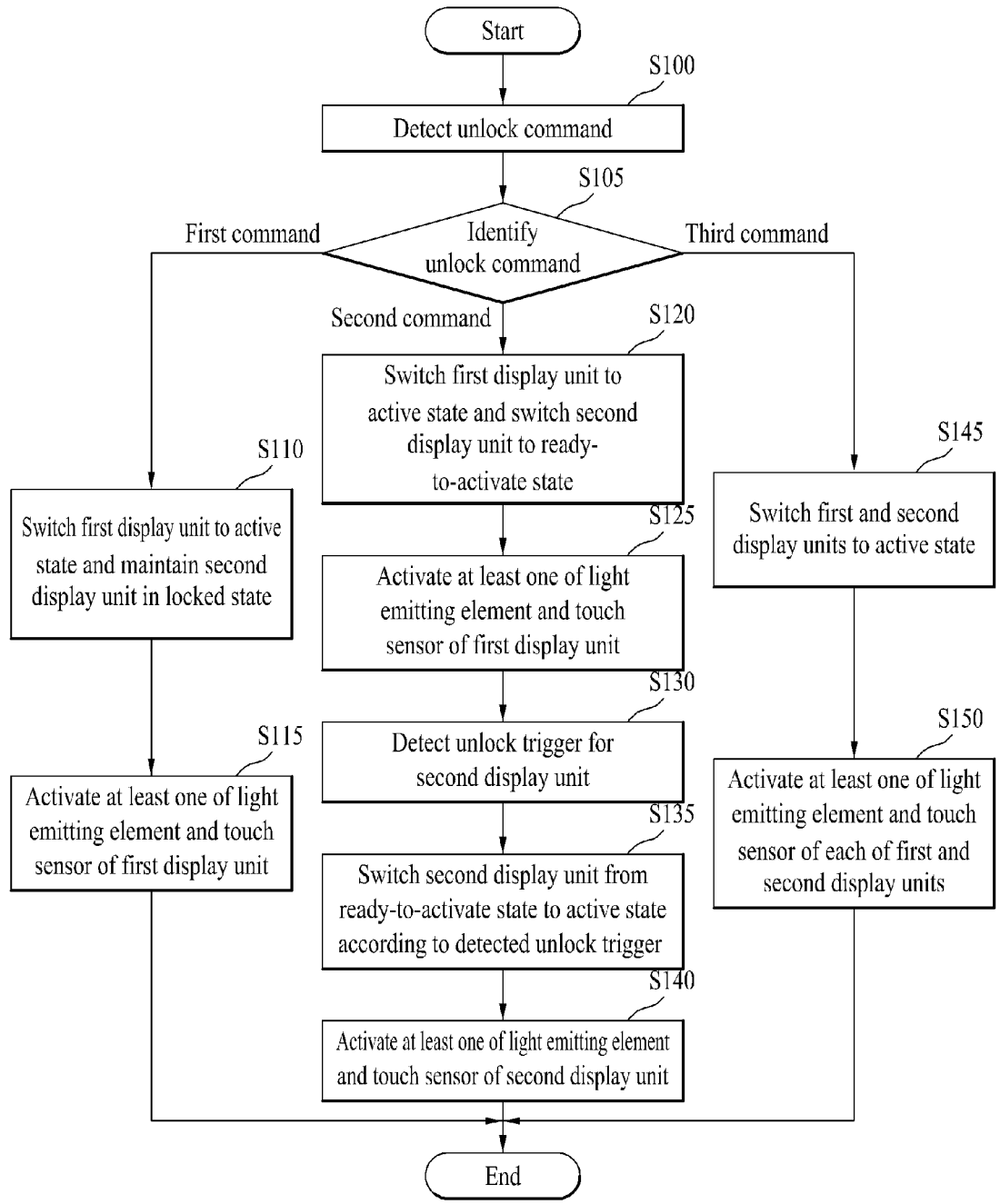
FIG. 13 is a flowchart illustrating a method for unlocking a display unit of a portable device according to another embodiment of the present invention.

FIG. 13 is a flowchart illustrating a method for switching the state of a display unit of a portable device according to an embodiment of the present invention. The portable device of the present invention may detect an unlock command (S100). The unlock command may be detected through the sensor unit of the camera unit of the portable device when the first and second display units are in a locked state. The unlock command may be detected not only using the touch input based method described above with reference to FIGS. 2 and 3 but may also be detected by sensing voice or gesture of the user or by sensing a motion of the portable device.

The portable device identifies the detected unlock command (S105). As described above with reference to FIG. 1, the unlock command may be one of the first unlock command which is to switch the state of the first display unit to an active state and to maintain the state of the second display unit, which is at the opposite side to the first display unit, in a locked state, the second unlock command which is to switch the state of the first display unit to an active state and to switch the state of the second display unit to a ready-to-activate state, and the third unlock command which is to switch the states of the first and second display units to an active state.

When the detected unlock command is the first unlock command, the portable device may switch the state of the first display unit to an active state and maintain the state of the second display unit in a locked state (5110). The portable device may activate at least one of the light emitting element and the touch sensor of the first display unit (S115). The portable device may provide content or execute an application using the first display unit which is an active state. In this case, the portable device does not activate the second display unit, which is in a locked state, even when an unlock trigger is detected.

When the detected unlock command is the second unlock command, the portable device may switch the state of the first display unit to an active state and switch the state of the second display unit to a ready-to-activate state (S120). The portable device may activate at least one of the light emitting element and the touch sensor of the first display unit (S125). When the second display unit is in a ready-to-activate state, the second display unit may be switched to an active state upon detection of an unlock trigger and cannot provide an application or content. However, the second display unit may display a guide message regarding an unlock trigger or may detect a touch input in order to detect an unlock trigger according to an embodiment.

The portable device may detect an unlock trigger for the second display unit which is in a ready-to-activate state (S130). The unlock trigger may be detected by sensing rotation, movement, or overturning of the portable device as described above with reference to FIGS. 5 to 8. The unlock trigger may also be detected by sensing a touch input on the first display unit or the second display unit and may also be detected through a command to execute an application which uses both the first and second display units.

When the unlock trigger is detected, the portable device may switch the second display unit from a ready-to-activate state to an active state (S135). The second display unit which is in an active state may display content associated with content displayed on the first display unit as described above with reference to FIGS. 9 and 10. For example, the second display unit may display the same content as that displayed on the first display unit, display detailed content linked with the content of the first display unit, or display information associated with multimedia content that is being reproduced on the first display unit.

In another embodiment, the second display unit may display content independently of the first display unit. The second display unit may arrange and display icons of applications when the second display unit is in an active state and may display an application executed by the user among the applications. In this manner, the second display unit may display content or an application independently of the first display unit.

When the detected unlock command is the third unlock command, the portable device may switch the state of each of the first display unit and the second display unit to an active state (S145). The portable device may activate at least one of the light emitting element and the touch sensor of each of the first and second display units (S150). The portable device may provide content or execute an application using the first and second display units which are in an active state.

FIG. 14 illustrates a double-sided foldable device in a flat state according to an embodiment of the present invention. The flat state may be detected when the double-sided foldable device 140 is opened or unfolded at a first angle or more on the basis of a folding line 146. The double-sided foldable device may include a first display unit 142 at the front side and a second display unit 144 at the rear side. That is, the double-sided foldable device 140 may respectively include the first display unit 142 and the second display unit 144 on the surfaces facing in opposite directions, in the flat state. The first display unit 142 and the second display unit 144 may display visual information and provide the displayed visual information to the user. The visual information displayed on the first display unit 142 and the second display unit 144 may be determined by a controller or a processor of the double-sided foldable device.

The double-sided foldable device may be folded on the folding line 146. When the double-sided foldable device is composed of two bodies, the double-sided foldable device may include a hinge that connects the two bodies. When the double-sided foldable device includes the hinge, the folding line 146 may be defined as a region where the hinge is located. The double-sided foldable device may be folded on the basis of the region where the hinge is located. While FIG. 14 shows that the folding line 146 is located at the center of the double-sided foldable device, this is an embodiment and the folding line 146 may divide the double-sided foldable device into two portions having different sizes. When the double-sided foldable device includes the two bodies, the first display unit 142 and the second display unit 144 may respectively include an LED (Light Emitting Diodes) panel, an OLED (Organic Light Emitting Diodes) panel, an LCD (Liquid Crystal Display) panel, an e-paper panel or a flexible display panel.

When the double-sided foldable device is composed of one body, the double-sided foldable device may include at least one flexible display unit or double-sided flexible display unit. For example, when the double-sided foldable device includes one flexible display unit and one normal display unit, the double-sided foldable device may include the normal display unit at the front side and the flexible display unit at the rear side, as shown in FIG. 14. When the double-sided foldable device includes two flexible display units, the double-sided foldable device may respectively include the first flexible display unit and the second flexible display unit at the front side and the rear side. This will be described later with reference to FIGS. 16 and 17. When the double-sided foldable device includes a single double-sided flexible display unit, the first display unit provided to the front side of the double-sided foldable device and the second display unit provided to the rear side of the double-sided foldable device may be implemented by a single double-sided flexible display unit. This will be described later with reference to FIGS. 16 and 17.

A flexible display unit may refer to a display unit that can be bent or curved. The double-sided foldable device including a flexible display unit may be folded along the folding line 146. The flexible display unit may be folded at an arbitrary position other than the predetermined folding line 146 and the arbitrary position at which the flexible display unit is folded may be set as the folding line 146. The first display unit 142 and the second display unit 144 included in the double-sided foldable device may respectively include an LED panel, an OLED panel, an LCD panel or an e-paper panel.

As shown in FIG. 14, the first display unit 142 of the double-sided foldable device 140 may be positioned at a portion of the front side of the double-sided foldable device 140. For example, the first display unit 142 can be located in one of two regions of the front side, which are divided by the folding line 146. The second display unit 144 of the double-sided foldable device 140 may be located in the entire area of the rear side of the double-sided foldable device 140. For example, the second display unit 144 can be located over two regions of the rear side, which are divided by the folding line 146. The second display unit 144 of the double-sided foldable device may be divided into a first portion and a second portion on the basis of the folding line 146 and the double-sided foldable device in a flat state may combine the first portion and the second portion to control the combined portions as the second display unit 144.

FIG. 15 illustrates the double-sided foldable device in a folded state according to an embodiment of the present invention. The double-sided foldable device 140 may be folded on the basis of the folding line 146. The folded state may be detected when the double-sided foldable device is folded at a second angle or more on the basis of the folding line 146. Here, the second angle, which is a reference angle of the folded state, may differ from the first angle, which is a reference angle of the flat state.

The double-sided foldable device 140 in the folded state may include the first display unit 142 as an outside display and the second display unit 144 as an inside display. That is, the double-sided foldable device may respectively include the first display unit 142 and the second display unit 144 on the outside surface and inside surface, in the folded state.

As shown in the upper part of FIG. 15, the double-sided foldable device 140 in the folded state may include the first display unit 142 as the outside display. The first display unit 142 may be a display unit which faces the user of the double-sided foldable device 140 in the folded state. As shown in the lower part of FIG. 15, the double-sided foldable device 140 in the folded state may include the second display unit 144 as the inside display. Since the second display unit 144 is located inside the double-sided foldable device 140 when the double-sided foldable device 140 is folded at the second angle or more, the second display unit 144 may be partially exposed or may not be exposed to the user. The second display unit 144 in the folded state may be divided into a first portion and a second portion by the folding line 146. While FIG. 15 shows that the first display unit 142 is located at a surface opposite the first portion of the second display unit 144, the first display unit 142 may be located at a surface opposite the second portion of the second display unit 144 according to an embodiment. While the lower part of FIG. 15 shows the double-sided foldable device 140 which is folded at a reduced folding angle in order to explain the inside display of the double-sided foldable device 140, the double-sided foldable device 140 in the folded state can be folded at an angle wider than the angle shown in the figure in practice.

FIG. 16 illustrates a double-sided foldable device in a flat state according to another embodiment of the present invention. The double-sided foldable device 160 may include a first display unit 162 at the front side and a second display unit 164 at the rear side.

The double-sided foldable device 160 shown in FIG. 16 may include two flexible display units. In this case, the first display unit 162 of the front side and the second display unit 164 of the rear side may be implemented by two flexible displays respectively located at the front side and the rear side. In another embodiment, the double-sided foldable device may include a single double-sided flexible display unit. In this case, the first display unit 162 of the front side and the second display unit 164 of the rear side may be implemented by a single double-sided flexible display unit.

The double-sided foldable device 160 in the flat state may include the first display unit 162 at the front side. The first display unit 162 may be divided into a first portion and a second portion on the basis of a folding line 166. In addition, the double-sided foldable device may include the second display unit 164 at the rear side thereof. The second display unit 164 may be divided into a first portion and a second portion on the basis of the folding line 166.

Figure 17:
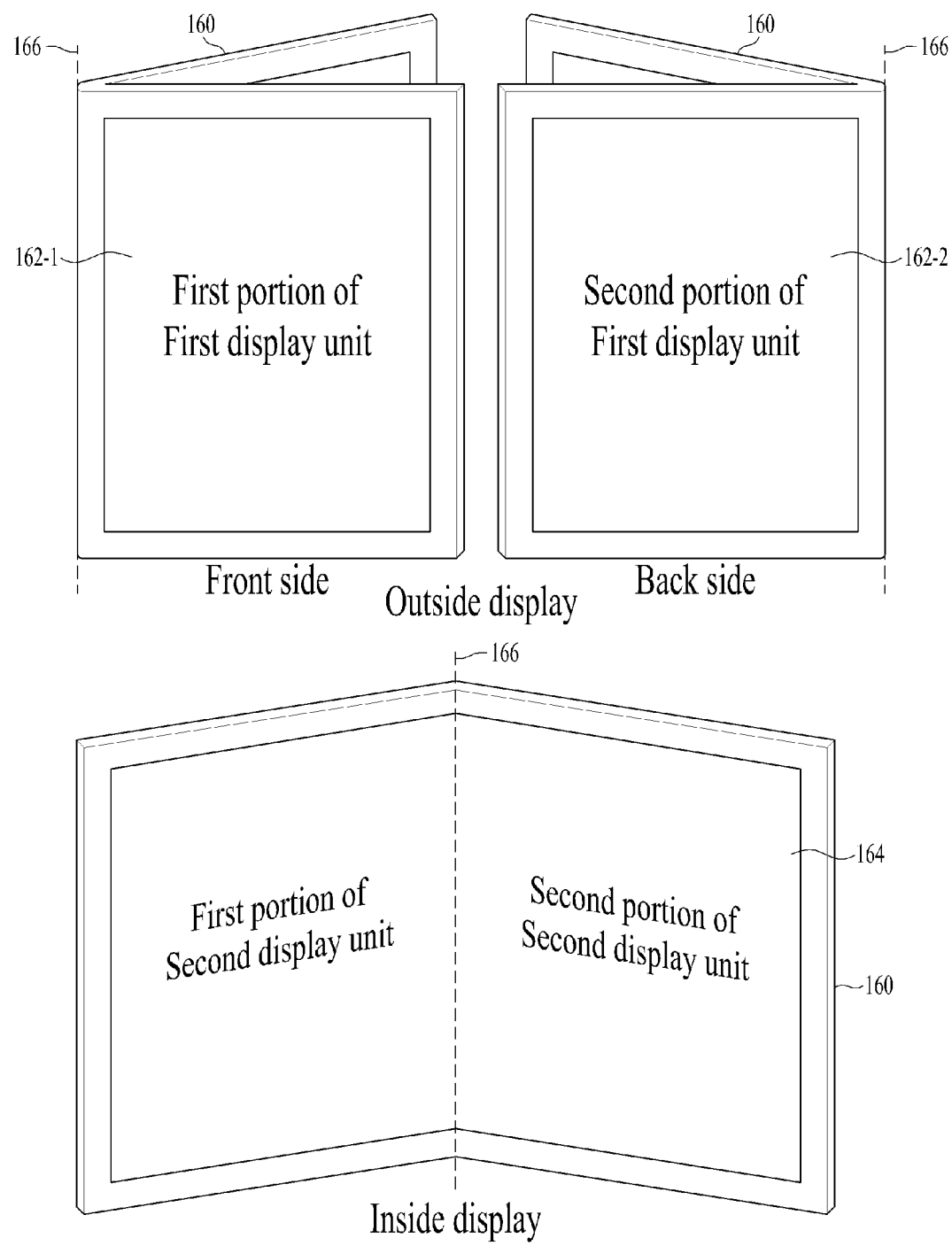
FIG. 17 illustrates the double-sided foldable device in a folded state according to another embodiment of the present invention.

FIG. 17 illustrates the double-sided foldable device in a folded state according to another embodiment of the present invention. The double-sided foldable device 160 may be folded on the basis of the folding line 166. The folded state may be detected when the double-sided foldable device 160 is folded at a second angle or more on the basis of the folding line 166. Here, the second angle, which is a reference angle of the folded state, may differ from the first angle, which is a reference angle of the flat state.

The double-sided foldable device 160 in the folded state may include a first display unit 162-1 and 162-2 as an outside display and a second display unit 164 as an inside display. That is, the double-sided foldable device may respectively include the first display unit 162-1 and 162-2 and the second display unit 164 on the outside surface and the inside surface, in the folded state.

As shown in the upper part of FIG. 17, the double-sided foldable device 160 in the folded state may include the first display unit 162-1 and 162-2 as the outside display. The first portion 162-1 of the first display unit may be provided to the front side of the outside surface of the double-sided foldable device 160 and the second portion 162-2 of the first display unit may be provided to the rear side of the outside surface of the double-sided foldable device 160. For example, the first portion 162-1 of the first display unit may be a portion positioned in a first direction facing the user of the double-sided foldable device 160 in the folded state. The second portion 162-2 of the first display unit may be a portion positioned in a second direction opposite to the first direction of double-sided foldable device in the folded state. That is, the first display unit corresponding to the outside display of the double-sided foldable device may be divided into the first portion 162-1 of the front side and the second portion 162-2 of the rear side on the basis of the folding line 166.

As shown in the lower part of FIG. 17, the double-sided foldable device 160 in the folded state may include the second display unit 164 as the inside display. Since the second display unit 164 is located inside the double-sided foldable device 160 when the double-sided foldable device 140 is folded at the second angle or more, the second display unit 164 may be partially exposed or may not be exposed to the user. The second display unit 164 in the folded state may be divided into a first portion and a second portion by the folding line 166.

In the double-sided foldable device 160 shown in FIG. 17, the first portion of the second display unit may be located corresponding to the inside of the first portion 162-1 of the first display unit and the second portion of the second display unit 164 may be located corresponding to the inside of the second portion 162-2 of the first display unit. While the lower part of FIG. 17 shows the double-sided foldable device 160 which is folded at a reduced folding angle in order to explain the inside display of the double-sided foldable device 160, the double-sided foldable device 160 in the folded state may be folded at an angle wider than the angle shown in the figure in practice.

The features of the double-sided foldable device, described with reference to FIGS. 14 and 15, may be equally or similarly applied to the double-sided foldable device shown in FIGS. 16 and 17 and thus redundant description is omitted.

FIG. 18 illustrates a double-sided foldable device in a flat state according to another embodiment of the present invention. The flat state may be detected when the double-sided foldable device 180 is opened or unfolded at a first angle or more on the basis of a folding line 186. The double-sided foldable device 180 may include a first display unit 182 and a second display unit 183 at the front side thereof and a third display unit 184 at the rear side. That is, the double-sided foldable device may include the first display unit 182 and the second display unit 183 on one of the surfaces facing in opposite directions, and the third display unit 184 on the other surface, in the flat state. The first, second and third display units 182, 183 and 184 may display visual information and provide the displayed visual information to a user. The visual information displayed through the first, second and third display units 182, 183 and 184 may be determined by a controller or a processor of the double-sided foldable device.

The double-sided foldable device may be folded on the folding line 186. When the double-sided foldable device is composed of two bodies, the double-sided foldable device may include a hinge that connects the two bodies. When the double-sided foldable device includes the hinge, the folding line 186 may be defined as a region in which the hinge is located. The double-sided foldable device may be folded on the basis of the region in which the hinge is located. While FIG. 18 shows that the folding line 186 is located at the center of the double-sided foldable device, this is an embodiment and the folding line 186 may divide the double-sided foldable device into two portions having different sizes.

As shown in FIG. 18, the first display unit 182 and the second display unit 183 of the double-sided foldable device 180 may be respectively located at the right and left of the folding line 186. The first display unit 182 and the second display unit 183 may be independent display units and may respectively display different pieces of visual information or display one piece of visual information together according to a control command of the controller or the processor.

The third display unit 184 of the double-sided foldable device 180 may be located in the entire area of the rear side of the double-sided foldable device 180. For example, the third display unit 184 can be located over two regions of the rear side, which are divided by the folding line 186. The third display unit 184 of the double-sided foldable device may be divided into a first portion and a second portion on the basis of the folding line 186, and the double-sided foldable device in the flat state may combine the first portion and the second portion to control the combined portions as the third display unit 184.

The display units included in the double-sided foldable device may respectively include an LED panel, an OLED panel, an LCD panel, an e-paper panel or a flexible display panel.

The features of the double-sided foldable device, described with reference to FIG. 14, may be equally or similarly applied to the double-sided foldable device shown in FIG. 18 and thus redundant description is omitted.

FIG. 19 illustrates a double-sided foldable device in a flat state according to another embodiment of the present invention. The flat state may be detected when the double-sided foldable device 190 is opened or unfolded at a first angle or more on the basis of a folding line 196. The double-sided foldable device 190 may include a first display unit 192 at the front side, and a second display unit 193 and a third display unit 194 at the rear side. That is, the double-sided foldable device may include the first display unit 192 on one of the surfaces facing in opposite directions, and the second display unit 193 and the third display unit 194 on the other surface, in the flat state. The first, second and third display units 192, 193 and 194 may display visual information and provide the displayed visual information to a user. The visual information displayed through the first, second and third display units 192, 193 and 194 may be determined by a controller or a processor of the double-sided foldable device.

The double-sided foldable device may be folded on the folding line 196. When the double-sided foldable device is composed of two bodies, the double-sided foldable device may include a hinge that connects the two bodies. When the double-sided foldable device includes the hinge, the folding line 196 may be defined as a region in which the hinge is located. The double-sided foldable device may be folded on the basis of the region in which the hinge is located. While FIG. 19 shows that the folding line 196 is located at the center of the double-sided foldable device, this is an embodiment and the folding line 196 may divide the double-sided foldable device into two portions having different sizes.

As shown in FIG. 19, the first display unit 192 of the double-sided foldable device 190 may be located corresponding to a portion of the front side of the double-sided foldable device 190. For example, the first display unit 192 can be located in one of two regions of the front side, which are divided by the folding line 196.

The second display unit 193 and the third display unit 194 provided to the backside of the double-sided foldable device 190 may be respectively located at the left and right of the folding line 196. The second display unit 193 and the third display unit 194 may be independent display units and may respectively display different pieces of visual information or display one piece of visual information together according to a control command of the controller or the processor.

The display units included in the double-sided foldable device may respectively include an LED panel, an OLED panel, an LCD panel, an e-paper panel or a flexible display panel.

The features of the double-sided foldable device, described with reference to FIG. 14, may be equally or similarly applied to the double-sided foldable device shown in FIG. 19 and thus redundant description is omitted.

FIG. 20 illustrates a double-sided foldable device in a flat state according to another embodiment of the present invention. The flat state may be detected when the double-sided foldable device 200 is opened or unfolded at a first angle or more on the basis of a folding line 206. The double-sided foldable device 200 may include a first display unit 201 and a second display unit 202 at the front side and a third display unit 203 and a fourth display unit 204 at the rear side. That is, the double-sided foldable device may include the first display unit 201 and the second display unit 202 on one of the surfaces facing in opposite directions and the third display unit 203 and the fourth display unit 204 on the other surface, in the flat state. The first, second, third and fourth display units 201, 202, 203 and 204 may display visual information and provide the displayed visual information to a user. The visual information displayed through the first, second, third and fourth display units 201, 202, 203 and 204 may be determined by a controller or a processor of the double-sided foldable device.

The double-sided foldable device may be folded on the folding line 206. When the double-sided foldable device is composed of two bodies, the double-sided foldable device may include a hinge that connects the two bodies. When the double-sided foldable device includes the hinge, the folding line 206 may be defined as a region in which the hinge is located. The double-sided foldable device may be folded on the basis of the region in which the hinge is located. While FIG. 20 shows that the folding line 206 is located at the center of the double-sided foldable device, this is an embodiment and the folding line 206 may divide the double-sided foldable device into two portions having different sizes.

As shown in FIG. 20, the first display unit 201 and the second display unit 202 provided to the front side of the double-sided foldable device 200 may be respectively located at the right and left of the folding line 206. The first display unit 201 and the second display unit 202 may be independent display units and may respectively display different pieces of visual information or display one piece of visual information together according to a control command of the controller or the processor.

The third display unit 203 and the fourth display unit 204 provided to the backside of the double-sided foldable device 200 may be respectively located at the left and right of the folding line 206. The third display unit 203 and the fourth display unit 204 may be independent display units and may respectively display different pieces of visual information or display one piece of visual information together according to a control command of the controller or the processor.

The display units included in the double-sided foldable device 200 may respectively include an LED panel, an OLED panel, an LCD panel, an e-paper panel or a flexible display panel.

The features of the double-sided foldable device, described with reference to FIG. 14, may be equally or similarly applied to the double-sided foldable device shown in FIG. 20 and thus redundant description is omitted.

Figure 21:
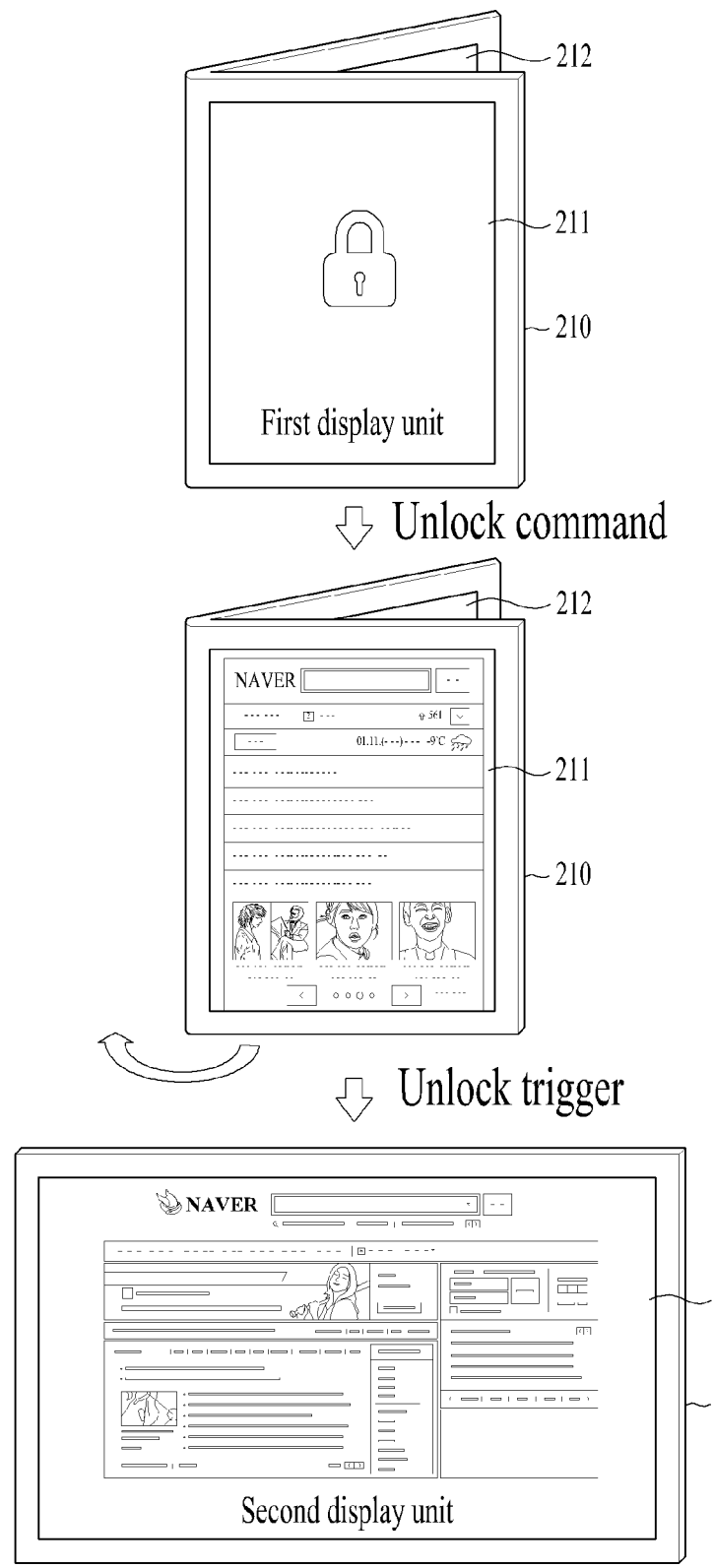
FIG. 21 illustrates operations of a double-sided foldable device in respective states according to an embodiment of the present invention.

FIG. 21 illustrates operations of a double-sided foldable device in respective states according to an embodiment of the present invention. While state switching will be described on the basis of the double-sided foldable device shown in FIGS. 14 and 15 in the following, the state switching can be equally applied to the double-sided foldable devices shown in FIGS. 16 to 20.

Referring to the upper part of FIG. 21, a folded double-sided foldable device 210 may include a first display unit 211 at the outside and a second display unit 212 at the inside. The first display unit 211 and the second display unit 212 of the folded double-sided foldable device 210 may be in a locked state. The locked state may refer to a state in which the double-sided foldable device is locked by a password, a lock pattern or a code of different type, which is set by the user of the double-sided foldable device. Furthermore, the locked state may refer to a state before a home screen displaying icons for executing applications included in the double-sided foldable device is displayed. Accordingly, when the double-sided foldable device is in the locked state, the user cannot directly execute an application and can select and execute an application after releasing the locked state through a tap, swipe or slide touch input. Further, the locked state may refer to a state in which at least one of a display unit and a touch sensor is inactive or a state in which the double-sided foldable device is in a sleep mode according to an embodiment.

Referring to the upper part of FIG. 21, the first display unit 211 in the locked state may display visual information indicating the locked state. The first display unit 211 in the locked state may activate the screen or partially activate the screen and activate the touch sensing region included in the first display unit 211 or partially activate the touch sensing region. The user may visually check the visual information displayed on the first display unit 211 located at the outside of the double-sided foldable device and recognize the locked state of the double-sided foldable device. The double-sided foldable device may receive an unlock command to release the locked state through the first display unit 211. The first display unit 211 may include a touch sensor for detecting the unlock command. The unlock command may include a pin number, an unlock pattern or a different type of code for releasing the locked state. Furthermore, the unlock command may include a tap, swipe or slide touch input for releasing the locked state.

The second display unit 212 in the locked state is located inside the double-sided foldable device and thus the second display unit 212 may deactivate the screen and the touch sensing region. The second display unit 212 in the locked state may partially activate the screen and the touch sensing region according to an embodiment.

The middle part of FIG. 21 shows the double-sided foldable device that has received the unlock command. Upon reception of the unlock command, the double-sided foldable device may switch the state of the first display unit 211 from the locked state to an active state and switch the state of the second display unit 212 form the locked state to a ready-to-activate state. The double-sided foldable device 210 may display a home screen or an application execution screen on the first display unit 211 switched to the active state. The home screen may be a screen displaying icons of applications included in the double-sided foldable device and the application execution screen may be a screen displaying execution of an application included in the double-sided foldable device. The first display unit 211 may activate the entire areas of the screen and the touch sensor in the active state. The double-sided foldable device 210 may display the application execution screen in a mobile format or a tablet format depending on the size of the first display unit 211 in the folded state. Arrangement, size or content of objects displayed on the application execution screen may depend on display format.

The double-sided foldable device 210 may maintain the entire areas of the screen and the touch sensing region in an inactive state for the second display unit 121 switched to the ready-to-activate state. However, the second display unit 212 in the ready-to-activate state may be switched to an active state by an unlock trigger, which will be described later, even when a separate unlock command is not input, unlike the second display unit 212 in a locked state. The ready-to-activate state refers to a state which can be switched to an active state even when the user does not input an unlock command That is, the ready-to-activate state may be switched to the active state through an unlock trigger alone even if the user does not apply a pin number, an unlock pattern or touch gesture. In other words, the ready-to-activate state corresponds to an intermediate state between the locked state and the active state and may be a state waiting for input of an unlock trigger. A display unit in the ready-to-activate state may deactivate the entire area of the screen or the light-emitting element of the display unit as described above, to thereby reduce power consumption.

The unlock trigger for the double-sided foldable device 210 may be generated and detected when the double-sided foldable device 210 in the folded state is switched to a flat state. That is, unfolding of the double-sided foldable device 210 at a predetermined angle or more may be detected through the unlock trigger. In addition, the double-sided foldable device 210 may detect the state that second display unit 212 faces the user according to unfolding, through the unlock trigger.

The lower part of FIG. 21 shows the double-sided foldable device that has received the unlock trigger. Upon application of the unlock trigger to the double-sided foldable device, the second display unit 212 may switch from the ready-to-activate state to the active state. The active state may refer to a state in which a lock state of a display unit is released and applications can be executed. Further, the active state may refer to a state in which the screen, light-emitting element and touch sensor of the display unit are activated. That is, when the locked state or the ready-to-activate state is a state in which the double-sided foldable device can be restrictively used, the active state may be a state in which restriction on use of the double-sided foldable device is released and the double-sided foldable device can be used according to intention of the user.

The double-sided foldable device 210 may display a home screen or an application execution screen on the second display unit 212 switched to the active state. The home screen or the application execution screen displayed on the second display unit 212 may be related to the home screen or application execution screen that was displayed on the first display unit in the folded state. That is, when the first display unit 211 displays the home screen, the double-sided foldable device 210 may display the home screen in an extended form on the second display unit 212. Here, the extended form may be defined as a form including additional icons in addition to at least one icon included in the home screen that was displayed on the first display unit 211. According to an embodiment, the extended form may be defined as a form of magnifying and displaying at least one icon included in the home screen that was displayed on the first display unit 211.

The double-sided foldable device 210 may display the application execution screen in a table format or personal computer (PC) format according to the size of the second display unit 212 in the flat state. If the first display unit 211 in the folded state displays the application execution screen in the mobile format, then the second display unit 212 in the flat state may display the application execution screen in the tablet format. If the first display unit 211 in the folded state displays the application execution screen in the tablet format, then the second display unit 212 in the flat state may display the application execution screen in the PC format. Since the display size is changed according to unfolding, the double-sided foldable device 210 may change the format of the displayed home screen or application execution screen and display the home screen or application execution screen in the changed format. Arrangement, size and content of objects displayed on the application execution screen may depend on display type.

The folded double-sided foldable device in the flat state may switch the state of the first display unit 211 from the active state to the ready-to-activate state. The first display unit switched to the ready-to-activate state may deactivate at least one of the screen and the touch sensing region. The double-sided foldable device may detect rotation as an unlock trigger for the first display unit 211 and switch the state of the first display unit 211 to the active state when the unlock trigger is detected. The operations of the double-sided device, described with reference to FIGS. 5a and 6, may be equally or similarly applied to the aforementioned operation.

FIGS. 22 and 23 illustrate correlation of visual information displayed in a folded state and an unfolded state of a double-sided foldable device according to an embodiment of the present invention. The double-sided foldable device 220 may display an application execution screen on the first display unit provided to the front side of the outside of the double-sided foldable device in the folded state, as described with reference to FIG. 21. When a first portion 221-1 of the first display unit is located at the front side of the double-sided foldable device 220, as shown in FIG. 22, the double-sided foldable device in a flat state may display an application execution screen, which has been displayed on the first portion 221-1 of the first display unit, on the second display unit 222 when the double-sided foldable device 220 is unfolded. Here, at least one of the form, size and arrangement of objects included in the application execution screen displayed on the second display unit 222 may differ from that included in the application execution screen that was displayed on the first portion 221-1 of the first display unit.

When a second portion 221-2 of the first display unit is located at the front side of the double-sided foldable device 220, as shown in FIG. 23, the double-sided foldable device in the flat state may display a home screen, which has been displayed on the second portion 221-2 of the first display unit, on the second display unit 222 when the double-sided foldable device 220 is unfolded. Here, at least one of the form, size and arrangement of objects included in the home screen displayed on the second display unit 222 may differ from that included in the home screen that was displayed on the second portion 221-2 of the first display unit.

As described above, the double-sided foldable device 220 may set visual information displayed on the second display unit 222 in the flat state differently, depending on which portion of the first display unit corresponds to the front side in the folded state. In addition, the visual information displayed on the second display unit 222 in the flat state may be related to the visual information displayed on the first display unit in the folded state. Particularly, the visual information displayed on the second display unit in the flat state may be related to visual information displayed on a portion of the first display unit, which faces the user or corresponds to the front side of the double-sided foldable device 220.

Figure 24:
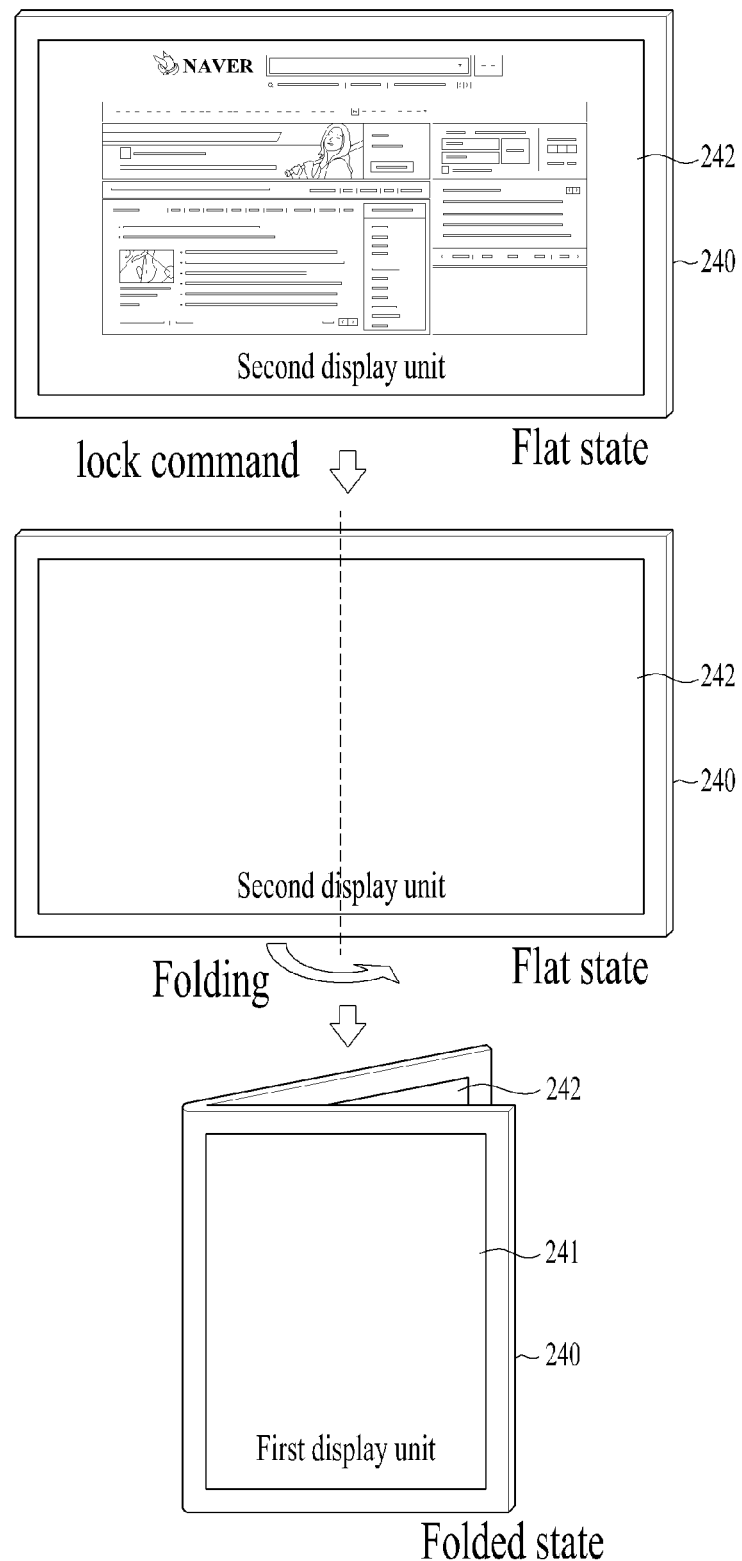
FIGS. 24 and 25 illustrate a method for switching the state of a double-sided foldable device from a flat state to a folded state according to an embodiment of the present invention.
Figure 25:
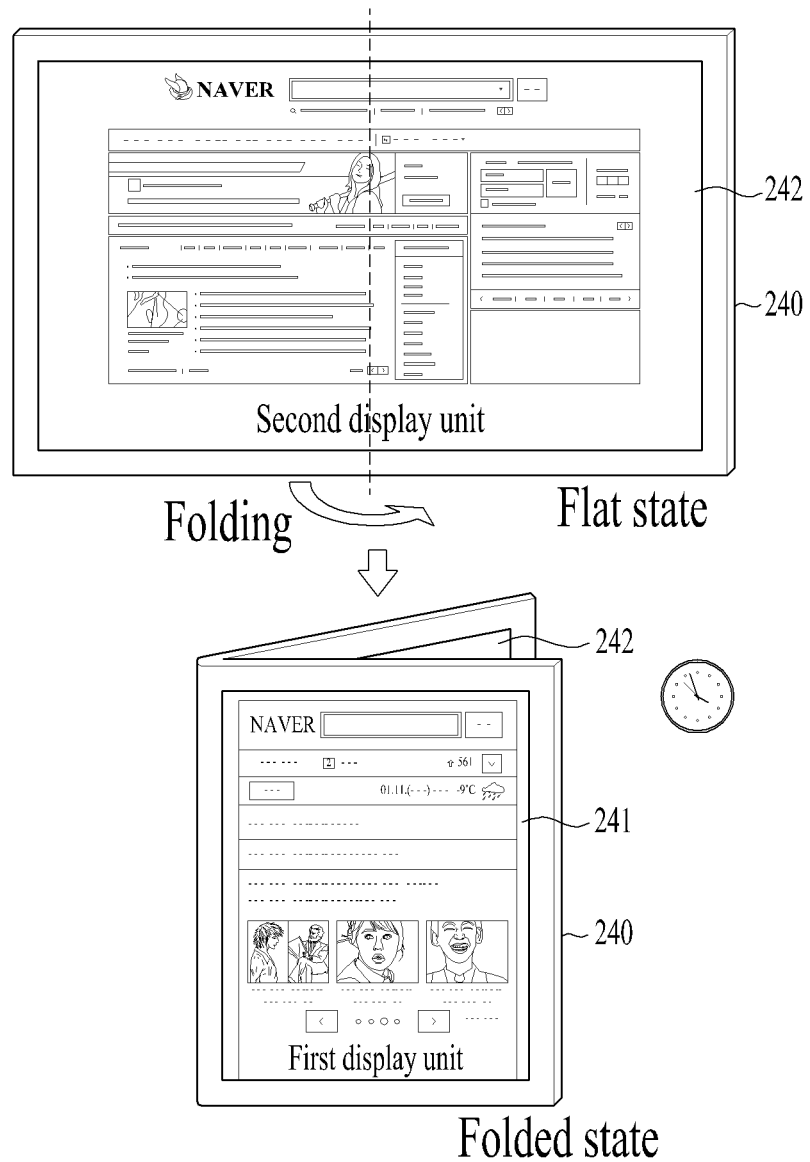

FIGS. 24 and 25 illustrate a method for switching the state of a double-sided foldable device from a flat state to a folded state according to an embodiment of the present invention. The double-sided foldable device 240 in the flat state, shown in the upper part of FIG. 24, may include the second display unit 242 in an active state at the front side. The second display unit 242 in the active state may display visual information. The double-sided foldable device 240 may detect a lock command in the flat state. The lock command may be a control command for switching the state of the second display unit 242 in the active state to a locked state. The lock command may be detected from a touch input applied to the second display unit 242 or an input applied to a hardware button included in the double-sided foldable device 240.

When the lock command is detected, the double-sided foldable device 240 may switch the state of the second display unit 242 from the active state to the locked state. As shown in the middle part of FIG. 24, at least one of the screen and the touch sensor of the second display unit 242 switched to the locked state may be deactivated. The second display unit 242 with the screen deactivated may turn off the screen by cutting power supplied to the light-emitting element thereof. When the lock command is detected, the double-sided foldable device 240 may additionally switch the state of the first display unit 241 located at the rear side to the locked state. Accordingly, even when the double-sided foldable device 240 switches from the flat state to the folded state, as shown in the lower part of FIG. 24, the first display unit 241 may be maintained in the locked state. Therefore, the user can simultaneously switch the states of the first display unit 241 and the second display unit 242 to the locked state by inputting the lock command to the double-sided foldable device 240 in the flat state.

In another embodiment, the double-sided foldable device 240 in the flat state, shown in the upper part of FIG. 25, may include the second display unit 242 in the active state at the front side. The second display unit 242 in the active state may display visual information. Here, the first display unit 241 located at the rear side of the double-sided foldable device 240 may be in a ready-to-activate state. The double-sided foldable device 240 may detect folding from the flat state to the folded state. That is, folding can be detected without the lock command, unlike the description shown in FIG. 24.

Upon detection of folding without the lock command, the double-sided foldable device 240 may switch the state of the second display unit 242 from the active state to a ready-to-activate state or locked state. At least one of the screen and the touch sensor of the second display unit 242 switched to the ready-to-activate state or locked state may be deactivated. The second display unit 242 with the screen deactivated may turn off the screen by cutting power supplied to the light-emitting element thereof. When folding is detected, the double-sided foldable device 240 may additionally switch the state of the first display unit 241 to the active state. Accordingly, when the state of the double-sided foldable device 240 switches from the flat state to the folded state, as shown in the lower part of FIG. 25, the first display unit 241 may be switched to the active state. Therefore, the user may be continuously provided with visual information through the first display unit 241 switched to the active state by folding the double-sided foldable device 240 in the flat state, which includes the second display unit 242 in the active state at the front side. Here, the second display unit 242, which becomes the inside display of the double-sided foldable device 240 according to folding, may be switched to the ready-to-activate state or locked state.

The double-sided foldable device 240 may apply dimming time to the first display unit 241 switched to the active state and, when no user input is detected within the dimming time, may switch the state of the first display unit 241 from the active state to the ready-to-activate state or locked state.

As described above, the portable device of the present invention can identify an unlock command and may switch the state of each of the first and second display units differently according to the identified unlock command. In addition, since the state of the second display unit is sequentially switched from a locked state to a ready-to-activate state and an active state, there is an advantage in that it is possible to prevent unnecessary power consumption or erroneous operation caused by unintended touch input.

MODE FOR INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention is totally or partially applicable to electronic devices.

What is claimed is:

1. A double-sided foldable device comprising:
a first display unit and a second display unit configured to display visual information, wherein when the double-side foldable device is in a folded state, the first display unit faces outside and the second display unit faces inside the double-sided foldable device, and wherein when the double-side foldable device is in a flat state, the first display unit faces in an opposite direction of the second display unit; and
a controller configured to:
detect an unlock command for switching a state of the first display unit from a locked state to an active state and switching a state of the second display unit from the locked state to a ready-to-activate state when the double-sided foldable device is in the folded state,
switch the state of the first display unit to the active state and the state of the second display unit to the ready-to-activate state when the unlock command is detected, detect an unlock trigger for switching the state of the second display unit from the ready-to-activate state to the active state, and switch the state of the second display unit to the active state according to the detected unlock trigger, wherein the ready-to-activate state is an intermediate state between the locked state and the active state.

2. The double-sided foldable device according to claim 1, wherein the unlock trigger is generated when the double-sided foldable device is unfolded from the folded state to the flat state.

3. The double-sided foldable device according to claim 1, wherein the unlock trigger is generated when the second display unit faces a user of the double-sided foldable device by unfolding the double-sided foldable device.

4. The double-sided foldable device according to claim 1, wherein the unlock command is detected at the first display unit when the double-sided foldable device is in the folded state.

5. The double-sided foldable device according to claim 1, wherein at least one of the first display unit and the second display unit includes a plurality of separate displays, respectively.

6. The double-sided foldable device according to claim 1, wherein the first display unit includes a first display area being positioned at front side of the double-sided foldable device and a second display area being positioned at back side of the double-sided foldable device when the double-sided foldable device is in the folded state.

7. The double-sided foldable device according to claim 6, wherein the unlock command is detected at the first display area of the first display unit when the double-sided foldable device is in the folded state.

8. The double-sided foldable device according to claim 6, wherein the unlock command switches the state of the first display area to the active state and the state of the second display area to the ready-to-activate state.

9. The double-sided foldable device according to claim 8, wherein the state of the second display area of the first display unit is switched from the ready-to-activate state to the active state by the unlock trigger.

10. The double-sided foldable device according to claim 1, wherein at least one of functions of the double-sided foldable device is restricted when the first display unit is in the locked state.

11. The double-sided foldable device according to claim 1, wherein the second display unit is inactivated in the locked state.

12. The double-sided foldable device according to claim 1, wherein the unlock trigger is detected through at least one of a touch sensor, a gravity sensor, a motion sensor, a gyro sensor, an acceleration sensor, an inclination sensor, and a brightness sensor.

13. The double-sided foldable device according to claim 1, wherein when the controller detects the unlock trigger for the second display unit, the controller is further configured to display visual information on the second display unit associated with the visual information displayed on the first display unit.

14. The double-sided foldable device according to claim 1, wherein when the double-sided foldable device is in the folded state, a first portion of the first display unit faces a user of the double-sided foldable device and a second portion of the first display unit is positioned at opposing surface of the first portion of the first display unit.

15. The double-sided foldable device according to claim 14, wherein when the first and second portions of the first display unit display visual information which are different from each other in the folded state, the controller is further configured to:

display a first visual information in the second display unit in case that the unlock trigger is detected with the first portion of the first display unit facing the user, and display a second visual information in the second display unit in case that the unlock trigger is detected with the second portion of the first display unit facing the user.

16. The double-sided foldable device according to claim 1, wherein when the second display unit is switched to the active state, the first display unit is switched to the ready-to-activate state.

17. The double-sided foldable device according to claim 16, wherein when the first display unit is in the ready-to-activate state, the controller is further configured to:

detect a lock command for switching the state of the second display unit from the active state to the locked state when the double-sided foldable device is in the flat state, switch the state of the first and second display units to the locked state according to the detected lock command, detect folding of the double-sided foldable device, wherein the double-sided foldable device is switched from the flat state to the folding state by the folding, and maintain the first display unit in the locked state.

18. The double-sided foldable device according to claim 16, wherein when the first display unit is in the ready-to-activate state and the second display unit is in the active state, the controller is further configured to:

detect folding of the double-sided foldable device, wherein the double-sided foldable device is switched from the flat state to the folding state by the folding, and switch the state of the first display unit to the active state and the state of the second display unit to the ready-to-activate state according to the detected folding.

19. The double-sided foldable device according to claim 18, wherein the controller is further configured to switch the state of the first and second display units to the locked state when a user input is not detected in a predetermined time after the folding of the double-sided foldable device.

20. A method for controlling a double-sided foldable device, the method comprising:

detecting an unlock command for the double-sided foldable device, wherein when the double-side foldable device is in a folded state, a first display unit faces outside and a second display unit faces inside the double-sided foldable device, and wherein when the double-side foldable device is in a flat state, the first display unit faces in an opposite direction of the second display unit, and wherein the unlock command switches a state of the first display unit from a locked state to an active state and a state of the second display unit from the locked state to a ready-to-activate state when the double-sided foldable device is in the folded state;

switching the state of the first display unit to the active state and the state of the second display unit to the ready-to-activate state when the unlock command is detected;

detecting an unlock trigger for switching the state of the second display unit from the ready-to-activate state to the active state; and switching the state of the second display unit to the active state according to the detected unlock trigger, wherein the ready-to-activate state is an intermediate state between the locked state and the active state.

* * * * *